US008477336B2

(12) United States Patent
Iwai et al.

(10) Patent No.: US 8,477,336 B2
(45) Date of Patent: Jul. 2, 2013

(54) USER-FRIENDLY IMAGE PROCESSING SYSTEM, MOBILE TERMINAL, IMAGE PROCESSING APPARATUS, AND RECORDING MEDIUM

(75) Inventors: Hidetaka Iwai, Itami (JP); Yoshiyuki Tamai, Itami (JP); Takeshi Minami, Amagasaki (JP); Kazumi Sawayanagi, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1198 days.

(21) Appl. No.: 11/840,275

(22) Filed: Aug. 17, 2007

(65) Prior Publication Data

US 2008/0052710 A1 Feb. 28, 2008

(30) Foreign Application Priority Data

Aug. 22, 2006 (JP) ................. 2006-225652

(51) Int. Cl.
*G06F 9/46* (2006.01)
(52) U.S. Cl.
USPC .......... 358/1.15; 358/1.14; 709/209; 718/100
(58) Field of Classification Search
None
See application file for complete search history.

(56) References Cited

U.S. PATENT DOCUMENTS

| 5,774,759 | A | 6/1998 | Tanaka | |
|---|---|---|---|---|
| 6,973,514 | B2 * | 12/2005 | Yamaguchi | 710/72 |
| 7,068,165 | B2 * | 6/2006 | Takahashi et al. | 340/539.26 |
| 7,110,132 | B2 * | 9/2006 | Takayanagi | 358/1.15 |
| 7,126,716 | B1 * | 10/2006 | Kaufman et al. | 358/1.18 |
| 7,200,390 | B1 * | 4/2007 | Henager et al. | 455/419 |
| 7,409,432 | B1 * | 8/2008 | Recio et al. | 709/209 |
| 2003/0210420 | A1 * | 11/2003 | Yamauchi | 358/1.14 |
| 2004/0046986 | A1 * | 3/2004 | Kuwabara et al. | 358/1.14 |
| 2004/0174557 | A1 * | 9/2004 | Sasama | 358/1.15 |
| 2004/0253981 | A1 * | 12/2004 | Blume et al. | 455/552.1 |
| 2005/0060564 | A1 * | 3/2005 | Murakami et al. | 713/200 |

FOREIGN PATENT DOCUMENTS

| JP | 10-283247 | 10/1998 |
|---|---|---|
| JP | 2002-196900 A | 7/2002 |
| JP | 2003-150362 A | 5/2003 |

(Continued)

OTHER PUBLICATIONS

Notification of Reasons for Refusal in JP 2006-225652 dated Feb. 10, 2009, and an English Translation thereof.

(Continued)

*Primary Examiner* — Steven Kau
*Assistant Examiner* — Ashish K Thomas
(74) *Attorney, Agent, or Firm* — Buchanan Ingersoll & Rooney PC

(57) ABSTRACT

A printing system includes an image formation apparatus for executing a print job of forming an image that has been received, and upon completing the print job, transmitting a notification of completion to the print job transmission source, and a client terminal for transmitting, to the image formation apparatus, the image formation print job based on a request from a user, and upon receiving the completion notification, alerting the user that the requested print job has been completed. When the number of print job transmission to the image formation apparatus does not match the number of completion notification receptions from the image formation apparatus, the client terminal prevents alerting the user of completion of the print job. When there is a match, the client terminal alerts the user of the print job completion, which had been prevented.

10 Claims, 27 Drawing Sheets

FOREIGN PATENT DOCUMENTS

| | | |
|---|---|---|
| JP | 2003-348283 A | 12/2003 |
| JP | 2004-021692 | 1/2004 |
| JP | 2004-056525 A | 2/2004 |
| JP | 2005-004368 | 1/2005 |
| JP | 2005-022342 A | 1/2005 |
| JP | 2005-094704 | 4/2005 |
| JP | 2005-292877 A | 10/2005 |

OTHER PUBLICATIONS

Notification of Reason for Refusal in JP 2006-225652 dated Oct. 7, 2008, and a English Translation thereof.

* cited by examiner

AUTHENTICATION INFORMATION ⤺ T1

| NAME | PASSWORD | ADDRESS |
|------|----------|---------|
| aaa | a1a2a3 | 10.10.10.10 |
| bbb | b1b2b3 | 10.11.11.11 |
| ... | ... | ... |

FIG.20

| | PRINT JOB | SCAN TRANSMISSION JOB |
|---|---|---|
| S262 (ERROR) | · CHANGE PRINT SIZE<br>· CHANGE COLOR/MONOCHROME<br>· CHANGE RESOLUTION | · CHANGE TRANSMISSION DESTINATION<br>· CHANGE TRANSMISSION METHOD<br>· CHANGE COLOR/MONOCHROME<br>· CHANGE RESOLUTION |
| S267 (BEFORE EXECUTION) | · CHANGE PRINT SIZE<br>· CHANGE COLOR/MONOCHROME<br>· CHANGE RESOLUTION<br>· CHANGE NUMBER OF PRINT SETS<br>· CHANGE NUMBER OF PRINT SHEETS<br>· CHANGE SORT | · CHANGE TRANSMISSION DESTINATION<br>· CHANGE TRANSMISSION METHOD<br>· CHANGE COLOR/MONOCHROME<br>· CHANGE RESOLUTION<br>· CHANGE FILE FORMAT |

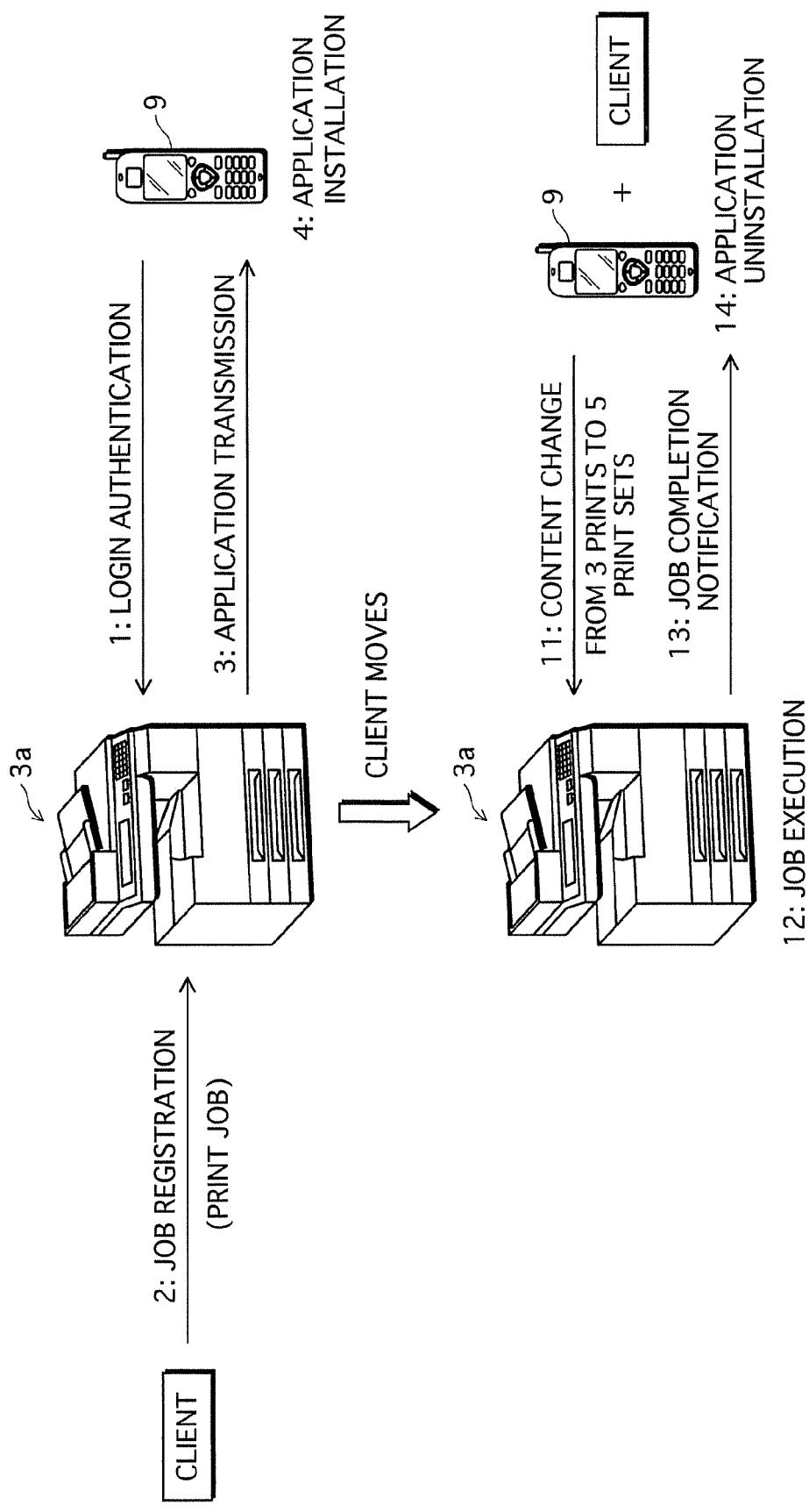

FIG.27

| MAIN FUNCTION | TYPE OF APPLICATION TO BE INSTALLED | | | |
| --- | --- | --- | --- | --- |
| | SCAN JOB APPLICATION | | | PRINT JOB APPLICATION |
| | SCAN TO BOX | SCAN TRANSMISSION | | |
| CHANGE RESOLUTION | ○ | ○ | | ○ |
| CHANGE NUMBER OF PRINT SHEETS | × | × | | ○ |
| CHANGE PRINT SIZE | × | × | | ○ |
| CHANGE NUMBER OF PRINT SETS | × | × | | ○ |
| CHANGE SORT | ○ | ○ | | ○ |
| CHANGE COLOR/MONOCHROME | ○ | ○ | | ○ |
| CHANGE FILE FORMAT | × | ○ | | × |
| CHANGE TRANSMISSION DESTINATION | × | ○ | | × |
| CHANGE TRANSMISSION METHOD | ○ | × | | × |
| CHANGE SAVE DESTINATION | × | × | | ○ |
| CHANGE OUTPUT MFP | | | | |

# USER-FRIENDLY IMAGE PROCESSING SYSTEM, MOBILE TERMINAL, IMAGE PROCESSING APPARATUS, AND RECORDING MEDIUM

This application is based on an application No. 2006-225652 filed in Japan, the content of which is hereby incorporated by reference.

BACKGROUND OF INVENTION

1. Field of the Invention

The present invention relates to image processing technology in an image processing system that includes an image processing apparatus and a mobile terminal.

2. Related Art

In recent years, image processing apparatuses (e.g., MFPs (Multiple Function Peripherals)) that include many processing functions such as print processing and FAX processing, as well as processing for transmitting a scanned image by mail (so-called "scan-mail") are being sold.

Such image processing apparatuses are relatively expensive, and their equipment requires a large amount of space. For this reason, printing systems that connect a large number of client terminals to a limited number of image processing apparatuses via a network are often used. Note that a client terminal user is also called a client.

In a group of clients, some may be separated far away from an image processing apparatus, and some may often be separated from their client terminal for reasons such as being in a conference. Printing systems that use mail, audio data, etc. to transmit a completion notification indicating the completion of a job sent to an image processing apparatus, an error notification indicating the occurrence of an error during job execution, or the like to such clients' mobile phones have been proposed.

Employing a printing system that transmits an error notification makes it possible in cases such as when an error occurs during the processing of printing data for the client to find out about the error, before reaching the image apparatus, from the error notification transmitted from the image processing apparatus, and to promptly deal with the error.

However, in conventional printing systems, although the client can promptly find out about the error from the error notification transmitted from the image processing apparatus, he/she must inevitably go to the installation site of the image processing apparatus and perform various operations and procedures to solve the error. In other words, conventional printing systems cannot be said to be user-friendly for the client.

SUMMARY OF INVENTION

The present invention has been achieved in view of the above issue, and aims to provide a user-friendly image processing system, image processing apparatus, mobile terminal, and recording medium.

In order to achieve the above aim, one aspect of the present invention is an image processing system including: an image processing apparatus that includes a job executor operable to receive an image processing-related job and execute the received job, an authenticator operable to authenticate that a user of a mobile terminal is registered in the image processing apparatus, a transmitter operable to transmit, to the mobile terminal of the authenticated user, a piece of application software that enables at least one operation equivalent to a user operation performed directly on the image processing apparatus in a case of execution of the job pertaining to the authenticated user, and a receiver operable to receive, from the mobile terminal, operation content of an operation performed on the job by the authenticated user with use of the piece of application software transmitted to the mobile terminal; and the mobile terminal that includes a receiver operable to receive the piece of application software, an application software executor operable to execute the received piece of application software, and a transmitter operable to transmit, to the image processing apparatus, the operation content in a case of the authenticated user performing the operation on the job with use of the application software, wherein the job executor of the image processing apparatus executes the job in accordance with the operation content received from the mobile terminal pertaining to the authentication.

In order to achieve the above aim, another aspect of the present invention is an image processing apparatus capable of communication with a mobile terminal and including a job executor for executing an image processing-related job, the image processing apparatus including: an authenticator operable to authenticate that a user of a mobile terminal is registered in the image processing apparatus; a transmitter operable to transmit, to the mobile terminal of the authenticated user, a piece of application software that enables at least one operation equivalent to a user operation performed directly on the image processing apparatus in a case of execution of the job pertaining to the authenticated user; and a receiver operable to receive, from the mobile terminal, operation content of an operation performed on the job by the authenticated user with use of the piece of application software transmitted to the mobile terminal, wherein the job executor of the image processing apparatus executes the job in accordance with the operation content received from the mobile terminal pertaining to the authentication.

In order to achieve the above aim, another aspect of the present invention is a mobile terminal capable of communication with an image processing apparatus for executing an image processing-related job, the mobile terminal including: a transmitter operable to transmit, to the image processing apparatus, authentication information necessary for authentication of a user of the mobile terminal in the image processing apparatus; a receiver operable to, when the user has been authenticated by the image processing apparatus, receive therefrom a piece of application software that enables at least one operation equivalent to a user operation performed directly on the image processing apparatus in a case of execution of the job pertaining to the authenticated user; and an application software executor operable to execute the received piece of application software, wherein the transmitter further transmits, to the image processing apparatus, operation content of an operation performed on the job by the authenticated user with use of the piece of application software.

In order to achieve the above aim, another aspect of the present invention is a storage medium having recorded thereon a program for causing an image processing apparatus, which is for executing an image processing-related job and capable of communication with a mobile terminal, to perform processing including: an authentication step of authenticating that a user of the mobile terminal is registered in the image processing apparatus; a transmission step of transmitting, to the mobile terminal of the authenticated user, a piece of application software that enables at least one operation equivalent to a user operation performed directly on the image processing apparatus in a case of execution of the job pertaining to the authenticated user; a reception step of receiving, from the mobile terminal, operation content of an operation performed on the job by the authenticated user with use of the piece of application software transmitted to the mobile terminal; and an execution step of executing the job in accordance with the operation content received from the mobile terminal pertaining to the authentication.

In order to achieve the above aim, another aspect of the present invention is a recording medium having recorded thereon a program for causing a mobile terminal, which is capable of communication with an image processing apparatus for executing an image processing-related job, to perform processing including: a first transmission step of transmitting, to the image processing apparatus, authentication information necessary for authentication of a user of the mobile terminal in the image processing apparatus; a reception step of, when the user has been authenticated by the image processing apparatus, receiving therefrom a piece of application software that enables at least one operation equivalent to a user operation performed directly on the image processing apparatus in a case of execution of the job pertaining to the authenticated user; and a second transmission step of transmitting, to the image processing apparatus, operation content of an operation performed on the job by the authenticated user with use of the piece of application software.

BRIEF DESCRIPTION OF DRAWINGS

These and other objects, advantages, and features of the invention will become apparent from the following description thereof taken in conjunction with the accompanying drawings, which illustrate specific embodiments of the present invention.

In the drawings:

FIG. 6 shows an authentication information management table pertaining to embodiment 1;

FIG. 20 shows a difference between an application for printing and an application for scan transmission pertaining to embodiment 1;

FIG. 21 describes another example pertaining to embodiment 1;

FIG. 27 shows main functions of other job applications.

DETAILED DESCRIPTION OF PREFERRED EMBODIMENTS

Embodiments of the present invention are described below with reference to the drawings. The embodiments are described as a printing system in which an MFP is applied as an image processing apparatus and a mobile phone is applied as a mobile terminal.

Embodiment 1

1. Overall Structure

Figure 1:
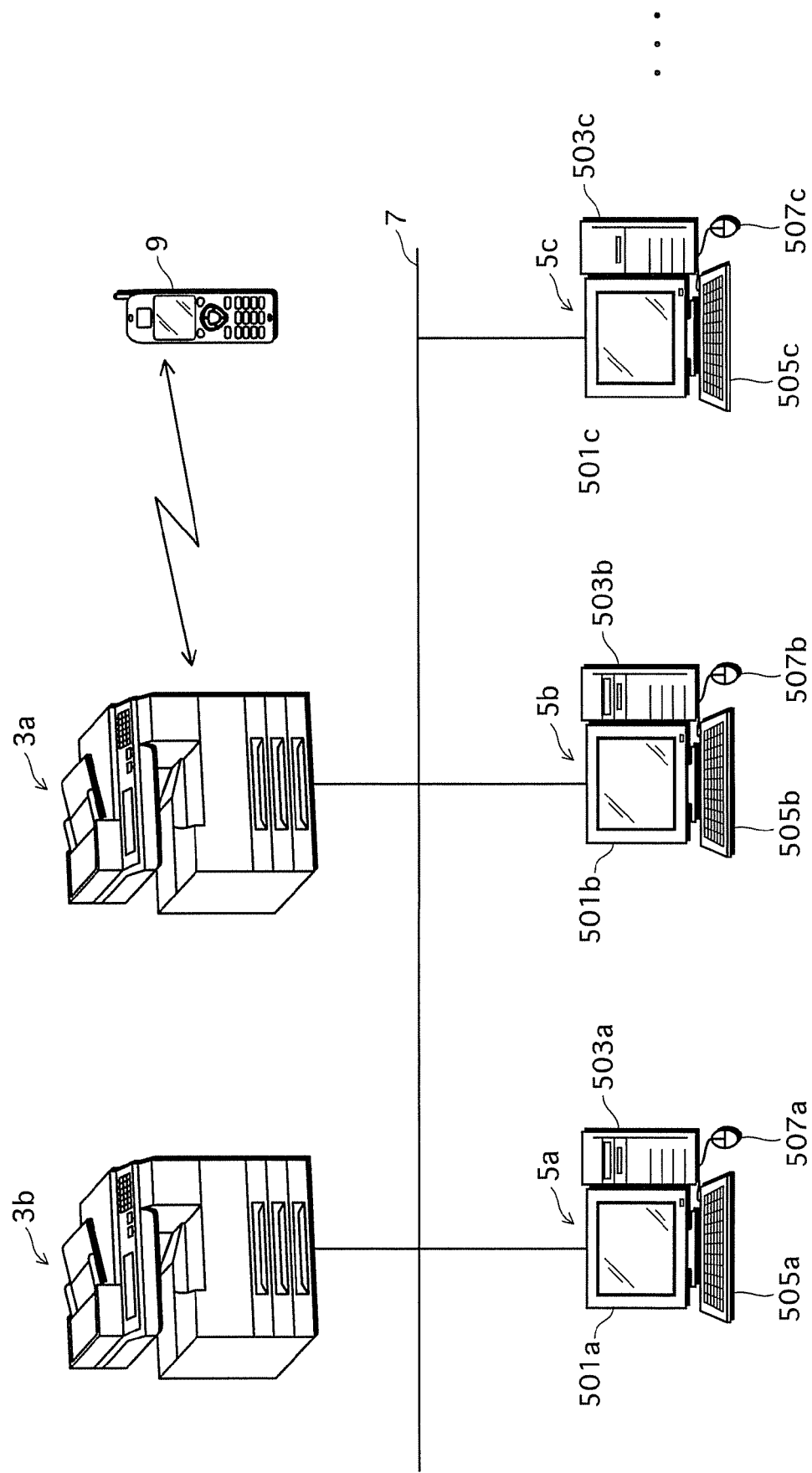
FIG. 1 shows an overall structure of a printing system pertaining embodiment 1.

The following describes an overall structure of a printing system pertaining to embodiment 1, using FIG. 1.

As shown in FIG. 1, a printing system 1 includes one or more MFPs (here, MFPs 3a and 3b), one or more client terminals (here, three or more client terminals 5a, 5b and 5c), and one more mobile phones (here, a mobile phone 9).

The MFPs 3a and 3b can perform processing such as print processing, copy processing, FAX transmission processing, scan processing, and processing for sending an E-mail with a scanned image attached thereto (hereinafter, E-mail is called simply "mail", and this function will be called as "mail transmission").

The MFPs 3a and 3b are connected to the client terminals 5a to 5c via a LAN 7, and are also connected to a telephone circuit, the Internet, and the like. Note that FAX transmission and mail transmission may be collectively called "scan transmission".

Specifically, the client terminals 5a to 5c and the MFPs 3a and 3b are connected to a LAN cable via a HUB (not depicted), and can communicate with each other using a predetermined protocol (here, TCP/IP protocol). Also, the LAN 7 is connected to the Internet via a router not shown in FIG. 1.

As a result, the MFPs 3a and 3b can receive print jobs from the client terminals 5a to 5c, transmit and receive FAXes, and transmit mail.

Note that in the case of a client or the client terminals 5a to 5c causing the MFP 3a or 3b to perform print processing, copy processing, FAX transmission processing, scan processing, or mail transmission processing, this can be performed by the client or the client terminals sending a print job, copy job, FAX transmission job, scan job, or mail transmission job, or instructing the MFP to execute such jobs.

Also, when the client performs a predetermined procedure (described in detail later) with respect to the MFP 3a, the MFP 3a receives, from the mobile phone 9 in the possession of the client, an operation for, for example, changing the content of a job that has been sent to the MFP 3a or solving an error that has occurred for some reason, and executes a job in accordance with the received operation.

Figure 2:
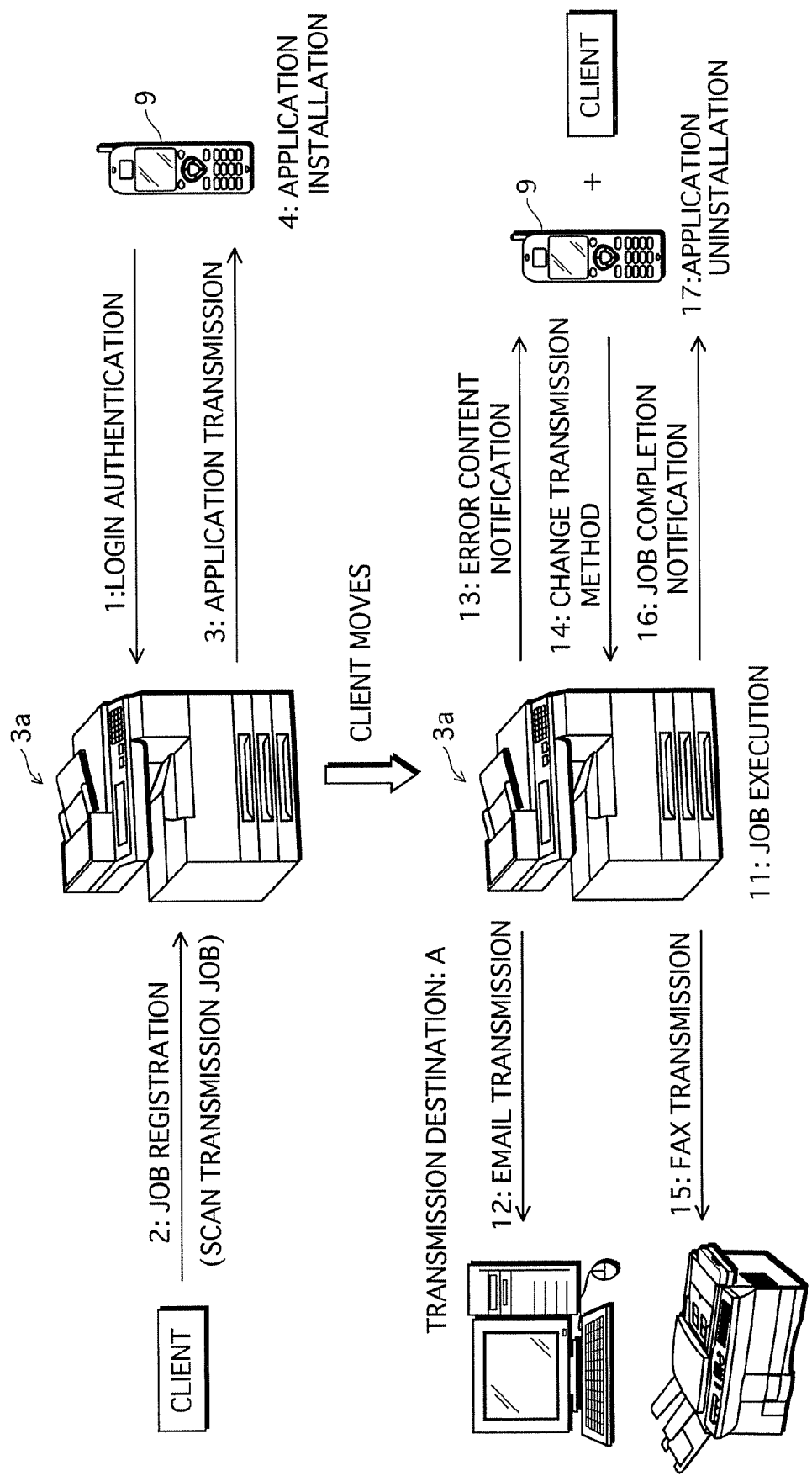
FIG. 2 describes exemplary processing of embodiment 1.

Next is a description of exemplary processing of embodiment 1 using FIG. 2.

First, the person intending a job request (i.e., the client) goes to the installation site of the MFP 3a, and performs login authentication (depicted as "1") between the mobile phone 9 and the MFP 3a. The login authentication is performed between the mobile phone 9 and the MFP 3a in order to allow various types of processing which are described hereinafter, and login is permitted when the mobile phone 9 is authenticated as the mobile phone 9 of a client who is registered in the MFP 3a.

After login authentication is performed, the client registers the job to be executed by the MFP 3a (depicted as "2"). Here, the registered job is a scan transmission job whose transmission destination is "A" and transmission method is "mail".

Upon receiving the registration of the job (scan transmission job) from the client, the MFP 3a transmits, to the mobile phone 9, a piece of application software (hereinafter, called simply an "application") to be used by the mobile phone 9 in connection with the registered job (depicted as "3"). Upon reception, the mobile phone 9 installs the received application (depicted as "4").

Next, the client moves from the MFP 3a to another location (this is not always required). The MFP 3a executes the job (depicted as "11"), and transmits a mail to the transmission destination "A" (depicted as "12").

If, for example, the mail address of the transmission destination "A" has changed, mail transmission will fail, a transmission error will occur, and the MFP 3a will notify error content to such effect to the mobile phone 9 (depicted as "13").

Upon finding out the content of the error from the mobile phone 9, the client uses the mobile phone 9 to perform an operation for changing the transmission method from mail transmission to FAX transmission (depicted as "14").

Upon receiving the operation, the MFP 3a changes the transmission method from mail transmission to FAX transmission in accordance with the operation instruction from the mobile phone 9, and transmits the previously scanned data to the transmission destination "A" as FAX data (depicted as "15"). When the FAX transmission has finished and the job has been completed, the MFP 3a transmits to the mobile phone 9 a notification that the job has been completed (hereinafter, called a "completion notification") (depicted as "16").

This enables the client to find out from the mobile phone 9 that the job has been completed, and the mobile phone 9 uninstalls the application that is no longer necessary since the job sent to the MFP 3a has been completed (depicted as "17").

As described above, even if, for example, there is a need to give an instruction to the MFP 3a, the client who requested the job can directly give the instruction without the trouble of having to go to the installation site of the MFP 3a or return to the installation site of the client terminal 5a, 5b or 5c.

Also, even if the client moves away from the MFP 3a and client terminals 5a to 5c after requesting a job to the MFP 3a, he/she can use the mobile phone 9 to send instructions to and perform operations on the MFP 3a.

Note that in the present embodiment, the instructions and notification content exchanged between the MFP 3a and the mobile phone 9 are stored in mail headers, and an identification number indicating a type of the mail is also stored in the mail headers. This enables the MEP 3a and mobile phone 9 to know what kind of information is stored in a received mail.

2. Apparatus Structures
2.1 MFP
(1) Overview

The MFP 3a has conventionally known functions, which are specifically performing the aforementioned print processing, copy processing, scan processing, FAX transmission/reception processing, mail transmission/reception processing, etc., as well as authenticating the mobile phone in the possession of the client, and receiving an operation regarding a job from the mobile phone that has been authenticated.

Note that although described in detail later, the mobile phone 9 includes an IC chip storing information pertaining to the client, and the authentication is implemented by providing the MFP 3a with a reader for reading such information.

(2) Appearance

Figure 3:
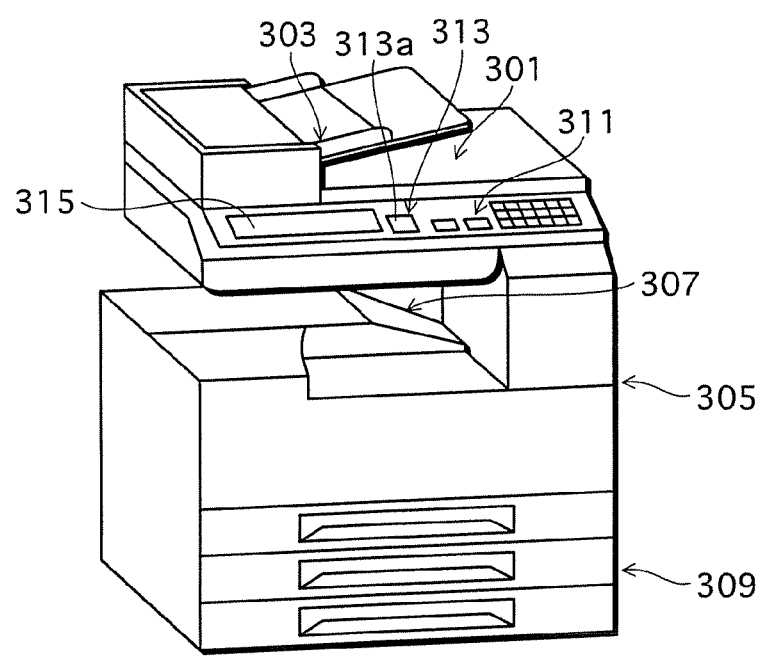
FIG. 3 is a schematic diagram showing an exemplary outward appearance of an MFP pertaining to embodiment 1.

The following describes an exemplary appearance of the MFP pertaining to embodiment 1 with reference to the FIG. 3.

As shown in FIG. 3, the MFP 3a includes a scanner 301 for acquiring image data by reading an original document or the like, a document feeder 303 for supplying a document (original) having an image formed thereon to the scanner 301, a printer 305 for performing image formation based on image data and print data, a tray 307 for retaining a document having an image formed thereon by the printer 305, a sheet supply part 309 for storing a recording sheet such as paper or film to be used in image formation and for supplying the recording sheet to the printer 305, an operation part 311 including a plurality of input keys such as character and symbol keys used for inputting the number of print sets, various settings, etc. (e.g., numeric keys), an IC reader 313a of an authenticator 313 for authenticating the mobile phone 9 of the client, a display 315 for showing various displays to the client, and the like.

Note that the display 315 is a touch panel system, and functions to detect a position on the touch panel where the client has touched with his/her finger and input the detection result as a signal. The display 315 also performs a portion of the functions of the aforementioned operation part 311.

Also, the displays shown to the client by the display 315 include messages indicating a job status during processing, a job reception status, an error, etc., guidance screens for when the client is configuring settings, a result of inputting a number of print sets, and the like.

(3) Hardware

Figure 4:
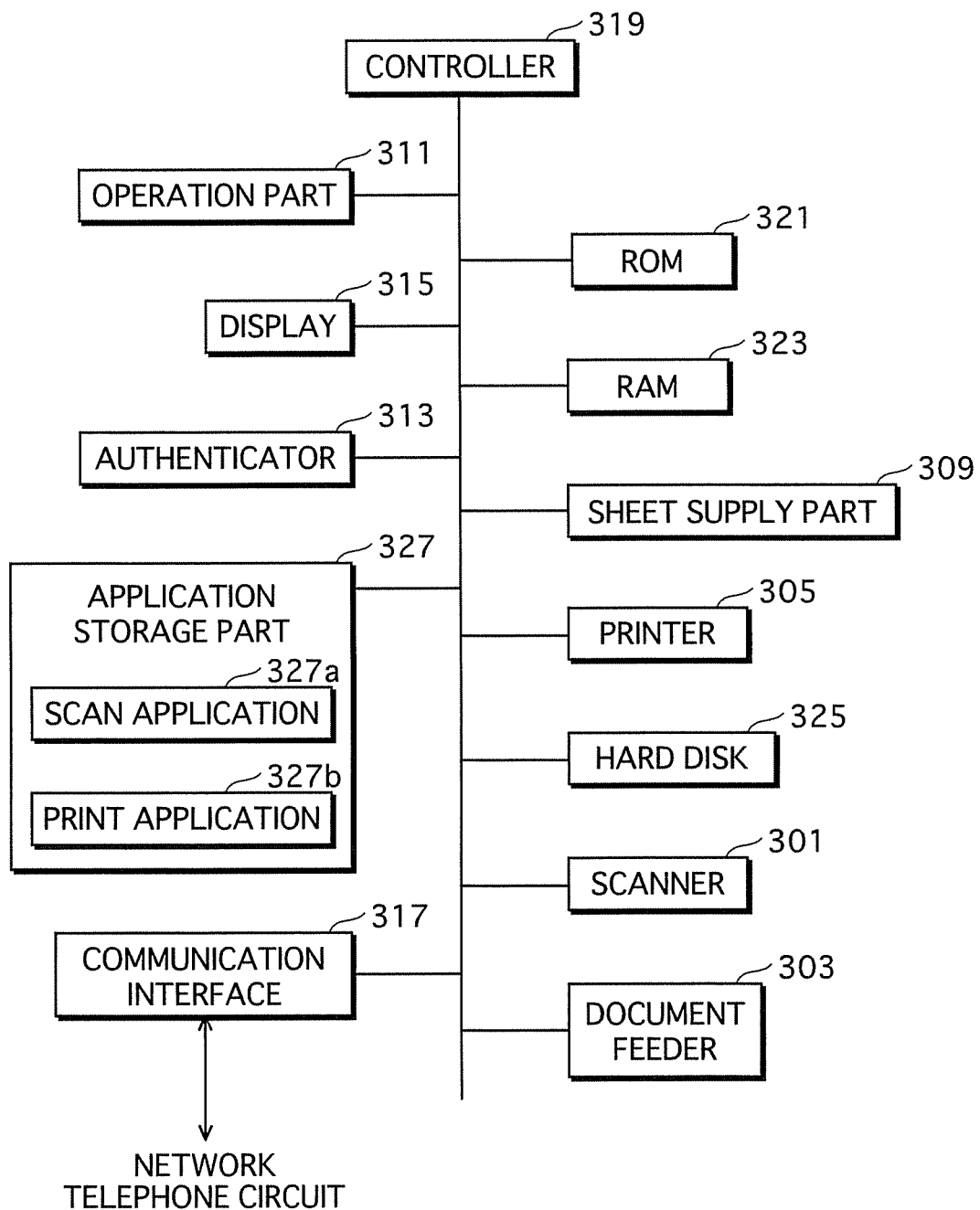
FIG. 4 shows an exemplary hardware structure in the MFP pertaining to embodiment 1.

The following describes hardware of the MFP pertaining to embodiment 1 with reference to FIG. 4.

As shown in FIG. 4, the MFP 3a includes the operation part 311, the display 315, the authenticator 313, the scanner 301, the sheet supply part 309, the printer 305, the document feeder 303, a communication interface 317, a controller 319, a ROM 321, a RAM 323, a hard disk 325, an application storage part 327, and the like.

The operation part 311, the display 315 and the document feeder 303 are as described above.

The scanner 301 photoelectrically reads the image drawn on the original document, and generates digital image data (here, the digital image data is density data that indicates a density of red (R), green (G), and blue (B), or black (Bl)). The thus obtained image data is used for image formation (printing) in the printer 305, as well as is converted to a file format such as TIFF, PDF, or JPEG, and stored to the hard disk 325 (this processing is called "scan to box" processing), is converted to FAX data and used in FAX transmission, is used as a file attachment for mail transmission, and the like.

The printer 305 prints, to a recording sheet supplied from the sheet supply part 309, an image read by the scanner 301, an image represented by data (may also be a document)

transmitted from the client terminal 5a, 5b, 5c, or the like which is connected via a network such as the LAN 7, an image represented by FAX data received by FAX, or the like.

As shown in FIG. 3, the authenticator 313 includes, for example, the IC reader 313a provided between the display 315 and the operation part 311. The IC reader 313a reads the information stored in the IC chip of the mobile phone, and outputs the read data to the controller 319.

The application storage part 327 stores the application to be installed in the mobile phone 9, and stores applications corresponding to job requests sent from the client or one of the client terminals 5a to 5c. In the present embodiment, the applications include a scan application 327a for scan transmission processing and a print application 327b for print processing.

The communication interface 317 performs communication (including mail transmission/reception), via the network, with external apparatuses such as the client terminals 5a to 5c and with external networks etc., and performs FAX transmission/reception via a telephone circuit. Note that an NIC (Network Interface Card), modem, terminal adapter or the like is used as the communication interface 317.

The ROM 321 stores for example, data and programs for realizing the processing functions such as print processing, copy processing, FAX transmission/reception processing, scan processing, mail transmission processing, scan to box processing, and the like. Needless to say, the ROM 321 also stores data and programs that realize the functions of the present embodiment.

All or a portion of these programs and data may be installed to the hard disk 325. In this case, the programs and data installed to the hard disk 325 are loaded to the RAM 323 as necessary.

The RAM 323 provides a work area for executing various jobs to be executed under control of the controller 319, and stores necessary programs, various types of tables, and the like.

Note that the functions described in the present embodiment can be realized by using not necessarily only the controller 319, but also dedicated hardware, and a portion of the functions can be realized by using functions of a general purpose program such as an operating system (OS).

(4) Controller

As shown in FIG. 4, the controller 319 controls the operation part 311, the display 315, the authenticator 313, the scanner 301, the sheet supply part 309, the printer 305, the document feeder 303, the communication interface 317, the ROM 321, the RAM 323, the hard disk 325, the application storage part 327, and the like. In other words, the controller 319 controls the parts that execute job processing, in cooperation with the aforementioned parts.

Figure 5:
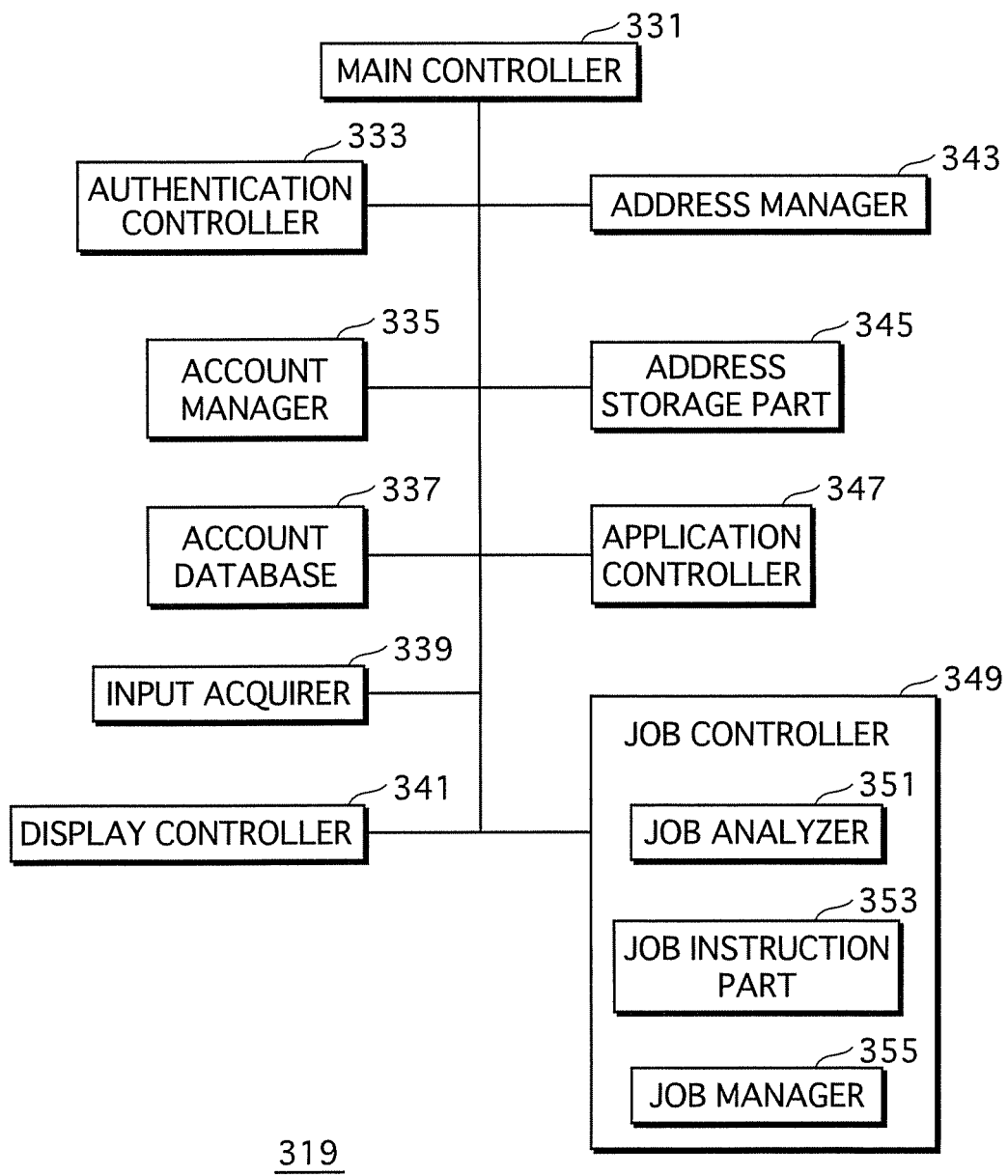
FIG. 5 is a block diagram of a controller of the MFP pertaining to embodiment 1.

Next is a description of an exemplary controller of the MFP pertaining to embodiment 1 with reference to FIG. 5.

As shown in FIG. 5, the controller 319 includes a main controller 331, an authentication controller 333, an account manager 335, an account database 337, an input acquirer 339, a display controller 341, an address manager 343, an address storage part 345, an application controller 347, and a job controller 349.

The display controller 341 controls content to be displayed by the display 315. The input acquisition part 339 acquires input from the operation part 311 (including the touch panel of the display 315). The input acquirer 339 and the display controller 341 are in association with each other, and the display controller 341 controls the content to be displayed on the display 315, depending on the content input via the operation part 311.

The job controller 349 mainly manages jobs, and includes a job analyzer 351, a job instruction part 353, and a job manager 355.

The job manager 355 performs management regarding jobs, registers jobs received from the client or the one of the client terminals 5a to 5c, determines a processing order of the registered jobs, and performs management of jobs being executed (e.g., management regarding whether an error has occurred during processing of a job).

The job analyzer 351 analyzes the types of the registered jobs. The job instruction part 353 gives various instructions to controllers and managers regarding a job, from among the jobs (not yet executed) managed by the job manager 355, that is to be processed next according to the processing order, and when there has been an instruction to change the content of the job, instructs the parts in accordance with the change.

For example, upon receiving a print job request from one of the client terminals 5a to 5c, first the job manager 355 registers the job, the job analyzer 351 analyzes the type of the registered job, and based on the analysis result, the job instruction part 353 instructs the sheet supply part 309, the printer 305 and the like, which are parts related to processing of the print job.

Also, if the job received from the client or one of the client terminals 5a to 5c is a job pertaining to authentication, the job controller 349 outputs a notification to such effect to the main controller 331.

The account manager 335 manages account information such as authentication information used when authenticating the mobile phone 9. The account database 337 stores the account information. Here, the account information includes authentication information, transmission information, billing information, access information, etc., and such information is managed in, for example, a management table.

The following describes an example of the authentication information pertaining to embodiment 1 with reference to FIG. 6.

As shown in FIG. 6, the account information includes names, passwords, and IP addresses of client terminals used by clients, which are stored in a management table T1.

Upon receiving an input of new information from the operation part 311, the account manager 335 adds the input information to the account database 337, and upon receiving an input of changed new information, rewrites the information in the account database.

Note that even when a change or addition to the account information is received from one of the client terminals 5a to 5c via the communication interface 317, the account manager 335 similarly changes or makes an addition to the information in the account database 337.

The address manager 343 manages other printers on the network, the address of the MFP 3b and the like (may also be a client terminal), mail addresses and FAX numbers that are the destinations of scan transmissions, and the like. The address storage part 345 stores various types of addresses in a storage table.

Even when a change or addition to an address is received via the operation part 311 or the communication interface 317, the address manager 343 changes or makes the addition to the address in the address storage part 345, similarly to the account manager 335.

The authentication controller 333 performs authentication of the mobile phone 9. Specifically, the authentication controller 333 judges whether the name and password acquired via the IC part 909 (see FIG. 7) of the client's mobile phone 9 matches authentication information registered in the account database 337 such as shown in FIG. 6. If there is a match, the authentication controller 333 outputs, to the below-described main controller 331, a notification for permitting login of the mobile phone 9 according to the authentication.

When there is notification from the main controller 331 that login of the mobile phone 9 has been permitted according to the authentication and a job pertaining to the authentication is registered, the application controller 347 transmits, to the mobile phone 9, an application corresponding to the job request received from the client in possession of the mobile phone 9. Also, upon receiving an operation instruction that has been created using the application on the mobile phone 9 and pertains to a job being executed or in order to be executed, the application controller 347 instructs the job instruction part 353 via the main controller 331 in accordance with the instruction.

Lastly, the main controller 331 performs overall control of managers such as the account manager 335 and controllers such as the authentication controller 333, and is constituted from a CPU or the like.

2.2 Mobile Phone (1) Overview

The mobile phone 9 performs conventionally known processing such as, specifically, phone communication processing and mail transmission/reception processing. The mobile phone 9 includes an IC chip that stores a mail address and information for authenticating the client.

Upon being authenticated with the MFP 3a, the mobile phone 9 performs operations using the application transmitted from the MFP 3a with respect to a job requested by the client in possession of the mobile phone. Note that the following distinction is made between expressions. The person in possession of the mobile phone is called a "user" when he/she is using the mobile phone 9 as a normal phone, and a "client" when he/she is using the mobile phone 9 in a manner pertaining to the present embodiment.

(2) Appearance

Figure 7:
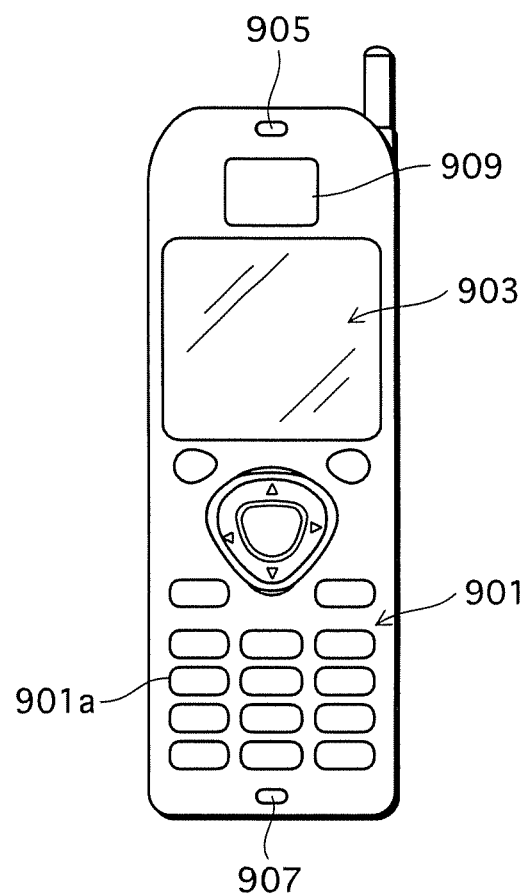
FIG. 7 is a schematic diagram showing an exemplary outward appearance of a mobile phone pertaining to embodiment 1.

The following describes an exemplary appearance of the mobile phone pertaining to embodiment 1 with reference to FIG. 7.

As shown in FIG. 7, the mobile phone 9 includes an operation part 901 including two or more number, character, or symbol input keys 901a used in the input of a phone number, mail address, etc.; a display 903 for displaying a phone number and mail content; a speaker 905 used during calling, a microphone 907, etc., as well as an IC part 909 provided with an IC chip for authentication, and the like.

(3) Hardware

Figure 8:
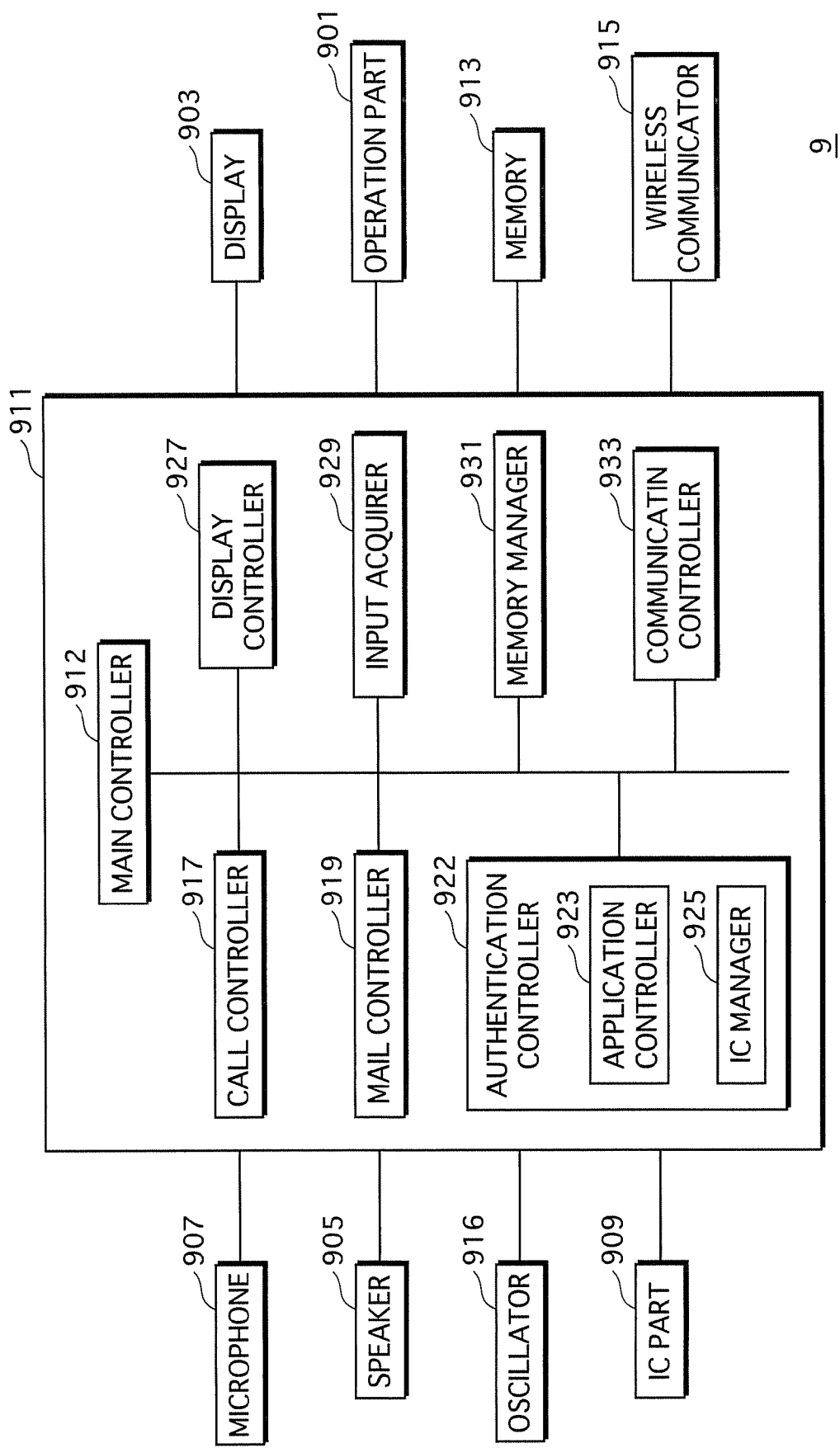
FIG. 8 shows an exemplary structure of a hardware structure of the mobile phone pertaining to embodiment 1.

The following describes exemplary hardware of the mobile phone pertaining to embodiment 1 with reference to FIG. 8.

As shown in FIG. 8, the mobile phone 9 includes a controller 911, a microphone 907, a speaker 905, an IC part 909, a display 903, an operation part 901, a memory 913, a wireless communicator 915, and an oscillator 916.

The IC part 909 includes an internal IC chip, and outputs (transmits), to the MFP 3a, the name (may be a nickname, abbreviation, etc.) of the user of the mobile phone 9, as well as password authentication information and the mail address of the mobile phone 9, by wireless communication.

The memory 913 stores information regarding the user of the mobile phone 9 (e.g., a profile including his/her name, mail address, etc.), others' phone numbers, mail addresses, addresses, etc. The wireless communicator 915 performs wireless communication with a closest base station.

Upon receiving an incoming call signal, the oscillator 916 oscillates the mobile phone 9 in order to alert the user of the incoming call. Note that the operation part 901 and the display 903 are the same as described above.

(4) Controller

As shown in FIG. 8, the controller 911 includes a main controller 912, a call controller 917, a mail controller 919, an authentication controller 922, a display controller 927, an input acquirer 929, a memory manager 931, and a communication controller 933.

The call controller 917 mainly performs control necessary to phone communication via the wireless communicator 915. Specifically, the call controller 917 transmits an outgoing call signal based on a phone number input by the user using the input keys 901a of the operation part 901, outputs a ring alert from the speaker 905 upon receiving an incoming call signal, converts audio input from the microphone 907 into digital signals for example, converts signals received from the wireless communicator 915 to audio and outputs the audio from the speaker 905, and the like.

The mail controller 919 mainly performs control necessary to mail transmission/reception such as packet communication via the wireless communicator 915. Specifically, the mail controller 919 performs processing such as storing a document input by user operation of the various keys of the operation part 901 (hereinafter, simply referred to as "storing to a mail") and transmitting a mail body storing the input document, transmitting a mail body with an image etc. attached (hereinafter, simply referred to as "attaching to a mail"), and also informs the client of mail reception, displays mail content on the display 903, and the like.

The authentication controller 922 includes mainly an application controller 923 and an IC manager 925. The authentication controller 922 mainly performs processing such as authentication with the MFP 3a, management and control of applications, management of authentication information, etc.

The application controller 923 temporarily stores an application attached to a mail from the MFP 3a to the memory 913, runs the application and displays, on the display 903, information regarding the job request that the client sent from the mobile phone 9, transmits instructions regarding the job from the mobile phone 9 to the MFP 3a, and the like.

The IC manager 925 mainly performs control necessary to authentication of the mobile phone 9 with the MFP 3a. Specifically, the IC manager 925 rewrites information in the IC chip of the IC part 909, and transmits the client's name, password, and mail address to the MFP 3a when the mobile phone 9 has approached the authenticator 313 of the MFP 3a.

The display controller 927 mainly performs control necessary to displays performed by the display 903. Specifically, the display controller 927 displays content input from the operation part 901, displays an application execution screen in accordance with an instruction from the application controller 923, and the like.

The input acquirer 929 mainly acquires numbers and characters input from the operation part 901, and the memory manager 931 mainly manages the memory 913. The memory manager 931, for example, stores phone numbers, addresses, and mail addresses input from the operation part 901 to the memory 913, and performs management such as saving and deleting applications from the MFP 3a.

The call controller 933 mainly performs control necessary to phone communication, packet communication, etc. via the wireless communicator 915. Lastly, the main controller 912 associates a manager such as the memory manger 931 with a controller such as the application controller 923.

2.3 Client Terminal

The following describes the client terminals 5a to 5c, which are each referred to as simply a "client terminal 5" since their structures etc. are basically the same.

The client terminal 5 is, for example, a PC (Personal Computer), and as shown in FIG. 1, includes a monitor 501, a main body 503, a key board 505, a mouse 507, and the like.

Software installed in the client terminal 5 includes an OS, applications, and various drivers such as printer drivers and monitor drivers.

The applications run on the OS, and include document creation, graphic creation, calculating table creation programs, and the like. The applications are installed via the OS, are saved in a storage part, and send, to the MFP 3a or 3b via the LAN 7, job requests for printing a document etc.

3. Description of Operations

3.1 MFP 3a

(1) Overview

Figure 9:
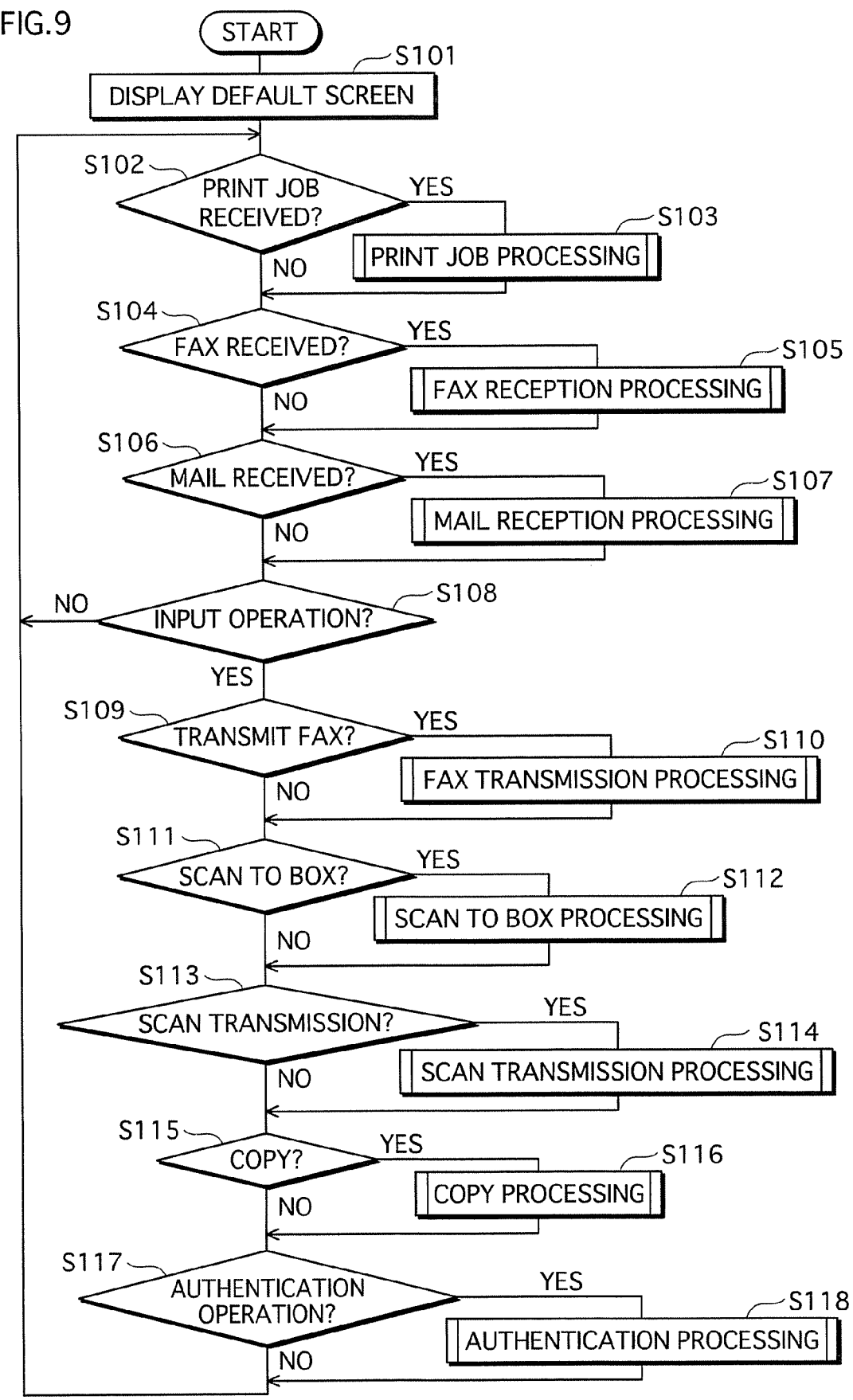
FIG. 9 is a flowchart showing processing of the controller of the MFP pertaining to embodiment 1.

The following describes exemplary operations of the MFP 3a with reference to FIG. 9.

The controller 319 first causes the display 315 to display a default screen (S101), and then proceeds to the next step.

If a print job is received from, for example, the client terminal 5a in step S102 (S102: YES), print job processing is executed (S103), and if a print job is not received (S102: NO), processing moves to step S104. Note that a description of the print job processing has been omitted since it is the same as conventionally known print processing.

If a FAX is externally received in step S104 (S104: YES), FAX reception processing is executed (S105), and if a FAX is not received (S104: NO), processing moves to S106. Note that a description of the FAX reception processing has been omitted since it is the same as conventionally known FAX reception processing.

If a mail is received in step S106 (S106: YES), mail reception processing is executed (S107), and if a mail is not received (S106: NO), processing moves to step S108. Note that a description of the mail reception processing has been omitted since it is the same as conventionally known mail reception processing.

If the input acquirer 339 receives input from the operation part 311 in step S108, that is, if there has been an input operation of the operation part 311 by the client (S108: YES), processing moves to step S109, and if there has not been an input operation of the client (S108: NO), processing returns to step S102.

In step S109, if the operation content of step S108 relates to FAX transmission (S109: YES), FAX transmission processing is executed (S110), and if the operation content is not related to FAX transmission (S109: NO), processing moves to step S111. Note that a description of FAX transmission processing has been omitted since it is the same as conventionally known FAX transmission processing.

In step S111, if the operation content of step S108 relates to scan to box (S111: YES), scan to box processing is executed (S112), and if the operation content is not related to scan to box (S111: NO), processing moves to step S113. Note that a description of scan to box processing has been omitted since it is the same as conventionally known scan to box processing.

In step S113, if the operation content of step S108 relates to scan transmission (S113: YES), scan transmission processing is executed (S114), and if the operation content is not related to scan transmission (S113: NO), processing moves to step S115. Note that a description of scan transmission processing has been omitted since it is the same as conventionally known scan transmission processing.

In step S115, if the operation content of step S108 relates to copying (S115: YES), copy processing is executed (S116), and if the operation content is not related to copying (S115: NO), processing moves to step S117. Note that a description of copy processing has been omitted since it is the same as conventionally known copy processing.

In step S117, if the operation content of step S108 relates to an authentication operation (S117: YES), the job instruction part 353 and the authentication controller 333 are caused to perform authentication processing (S118), and if the operation content is not related to an authentication operation (S117: NO), processing returns to step S102.

(2) Authentication Processing

Figure 10:
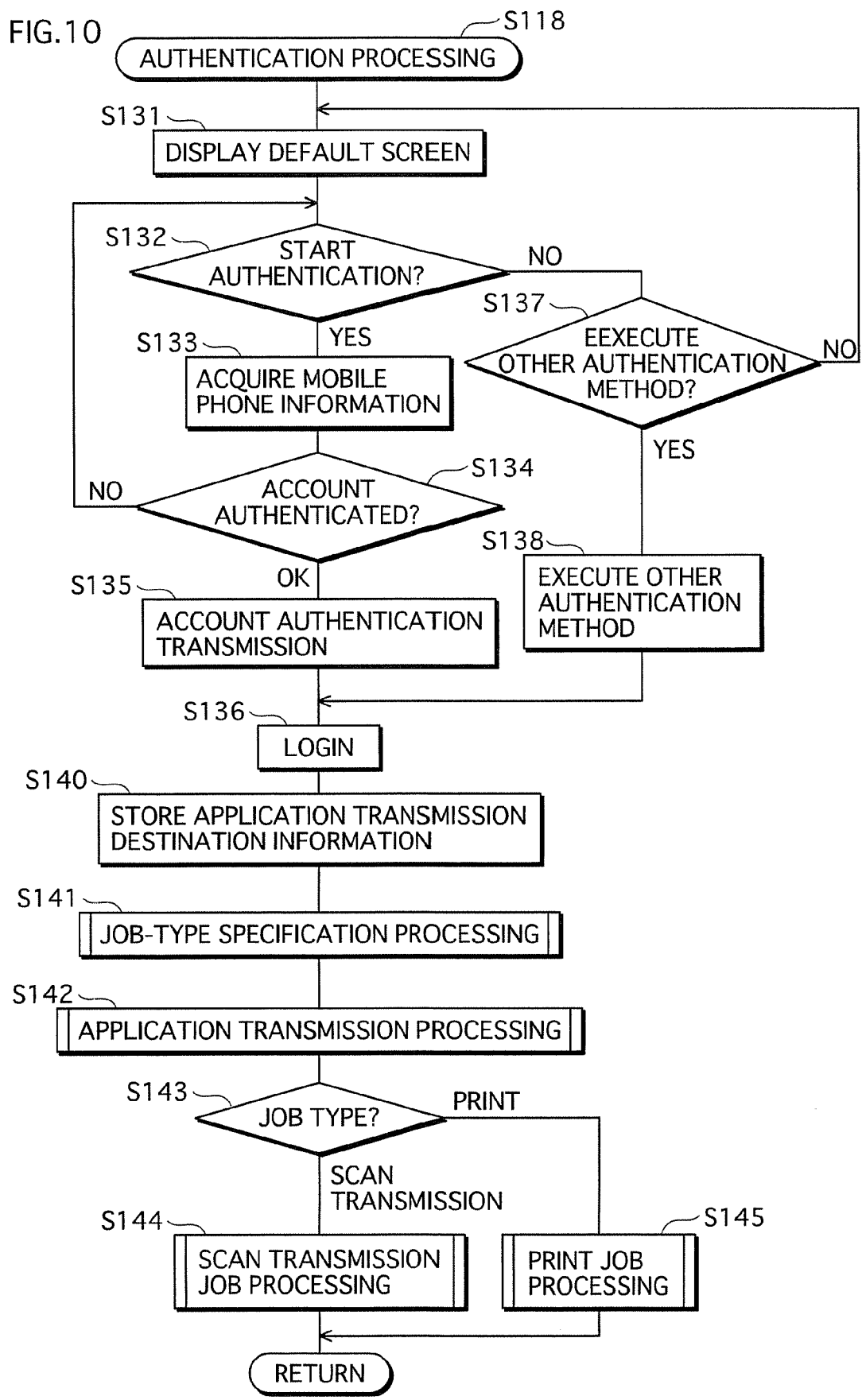
FIG. 10 is a flowchart showing authentication processing pertaining to embodiment 1.

The following describes an example of the authentication processing pertaining to embodiment 1 with reference to FIG. 10.

Upon receiving an operation pertaining to the authentication operation from the client in step S108 of FIG. 9, the main controller 319 causes, via the display controller 314, the display 315 to display a default authentication screen (S131). The default authentication screen is a guidance screen etc. displayed to the client for performing authentication of the mobile phone 9, and here, is a screen displaying whether authentication processing has begun.

Whether there has been a client operation (e.g., input on the touch panel) for starting authentication in accordance with the screen displayed on the display 315 is judged (S132), and if there has been an operation for starting authentication, processing moves to step S133, and information (authentication information) and the mail address of the mobile phone 9 are acquired.

Here, after performing the operation for starting authentication using the touch panel etc., the client brings the IC part 909 of the mobile phone 9 close to the IC reader 313a of the authenticator 313 of the MFP 3a. As a result, the authentication controller 333 of the MFP 3a acquires, from the authenticator 313 by wireless communication, the name of the client and the password stored in the IC part 909 of the mobile phone 9 (S133), the acquired name and password are stored in the account database 337, and whether the account has been registered in advance is checked (S134) [0155] If the name and password acquired from the mobile phone 9 match an account in step S134 (S134: OK), account authentication is notified to the mobile phone 9 with use of, for example, mail (S135), and the mobile phone 9 is permitted to login (S136).

On the other hand, if the client has not performed the operation for starting authentication in step 132 (S132: NO), processing proceeds to step S137, in which the display controller 341 causes the display of an option to perform another authentication method, and waits for client input to be acquired via the input acquirer 339.

If the client input instructs the execution of another authentication method (S137: YES), the authentication controller 333 performs authentication processing using a preregistered other authentication method (e.g., the client directly inputs their name and password using the operation part 311) (S138), and login is permitted if the account is authenticated. The mail address of the mobile phone 9 is also input at this time.

On the other hand, if the client input instructs that another authentication method is not to be executed (S137: NO), the main controller 331 returns to step S131.

When login is authenticated in step S136, the address manager 343 stores the mail address of the mobile phone 9 that was acquired in steps S133 and S138 in the address storage part 345 as information pertaining to the transmission destination of the application (S140), and performs job-type specification processing for specifying the type of the job pertaining to the authentication of the mobile phone 9 (S141).

Here, "job type" refers to, for example, a print job, copy job, or a scan transmission job.

Figure 11:
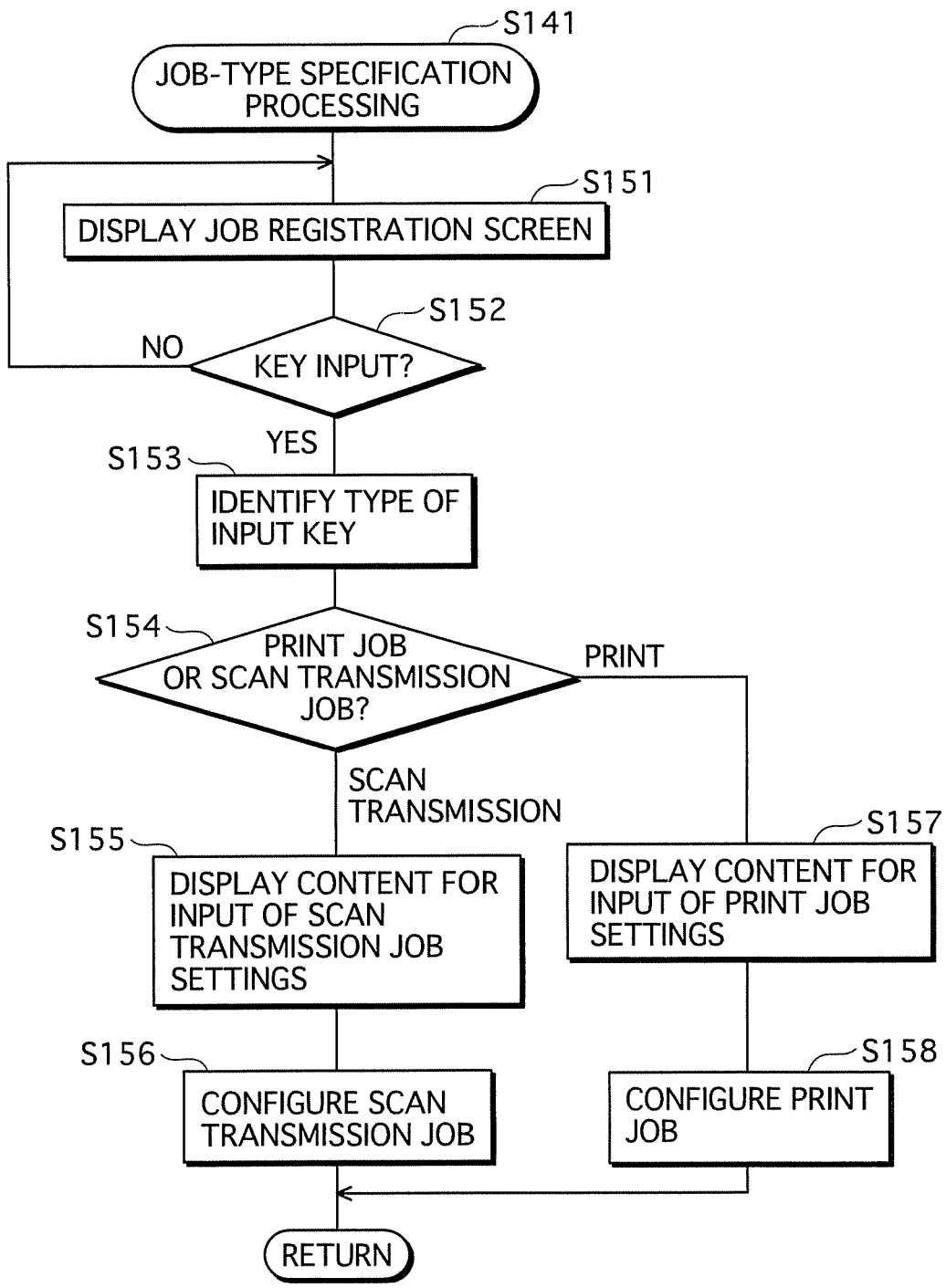
FIG. 11 is a flowchart showing job-type specification processing pertaining to embodiment 1.

The following describes an example of the job-type specification processing (S141) pertaining to embodiment 1 with reference to FIG. 11.

In the job-type specification processing, first the display controller 341 displays a job registration screen on the display 315 (S151). The job registration screen includes an explanation, guidance, and the like for receiving a job (job type) pertaining to the authentication of the mobile phone from the user. Also, the main controller 331 determines, via the input acquirer 339, whether key input has been received from the client (S152).

If key input has been received from the client (S152: YES), the main controller 331 identifies the type of key input (S153), and based on the type of key input, the job analyzer 351 analyzes which type the job is (here, a print job or scan transmission job). Note that although the job pertaining to the authentication in the present embodiment includes two types, namely a print job and a scan transmission job, the present embodiment is not limited to these two types of jobs.

If the job type is scan transmission job in step S154 (S154: SCAN TRANSMISSION), the main controller 331 causes, via the display controller 341, the display 315 to display content for inputting settings of the scan transmission job (S155), receives an input regarding the scan transmission job from the operation part 311 via the input acquirer 339, and controls the job manager 355 to configure the scan transmission job according to the input settings (S156). Thereafter, processing returns and proceeds to step S142 of FIG. 10.

On the other hand, if the job type is a print job in step S154 (S154: PRINT), the main controller 331 causes, via the display controller 341, the display 315 to display content for inputting settings of the print job (S157), receives an input regarding the print job from the operation part 311 via the input acquirer 339, and controls the job manager 355 to configure the print job according to the input settings (S158). Thereafter, processing returns and proceeds to step S142 of FIG. 10.

Returning now to FIG. 10, application transmission processing is performed in step S142.

Figure 12:
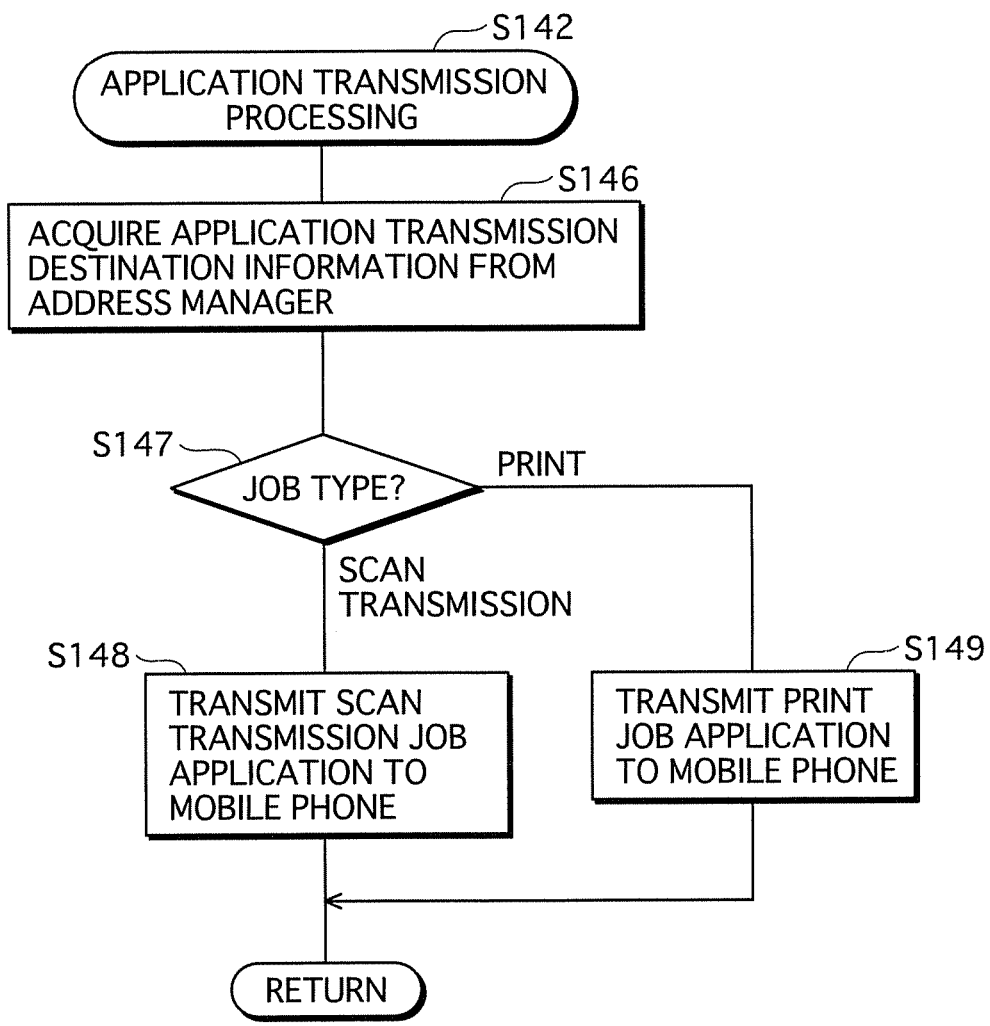
FIG. 12 is a flowchart showing application transmission processing pertaining to embodiment 1.

The following describes an example of the application transmission processing (S142) pertaining to embodiment 1 with reference to FIG. 12.

The application transmission processing is processing for transmitting an application regarding the job pertaining to the authentication, to the mobile phone 9 that has been authenticated. The application to be sent is for, for example, sending an error-solving instruction from the mobile phone 9 to the MFP 3a if there has been an error etc. during job processing, or sending content changes from the mobile phone 9 to the MFP 3a in a case of changing the processing content of the job.

When the type of the job is specified as described above, the application controller 347 acquires, from the address manager 343, the application transmission destination information that is stored in the address storage part 345 (S146). If the job type is a scan transmission job (S147: SCAN TRANSMISSION), the application controller 347 transmits, by mail for example, an application for operating the scan transmission job to the application transmission destination (S148), and thereafter, processing returns and proceeds to step S143 of FIG. 10.

On the other hand, if the job type is a print job (S147: PRINT), the application controller 347 transmits, by mail for example, an application for operating the print job to the application transmission destination (S149), and thereafter, processing returns and proceeds to step S143 of FIG. 10.

Returning now to FIG. 10, if the job type in step S143 is a scan transmission job (S143: SCAN TRANSMISSION), processing proceeds to scan transmission job processing (S144), and if the job type is a print job (S143: PRINT), processing proceeds to print job processing (S145).

The following describes the scan transmission job processing and the print job processing. Note that in the present embodiment, flows of the scan transmission job processing and print job processing are substantially the same (only the processing content of the jobs are different). Therefore, the following first describes the scan transmission job processing, and thereafter is a description of print job processing which focuses on differences from the processing content of the scan transmission job.

(2.1) Scan Transmission Job Processing

Figure 13:
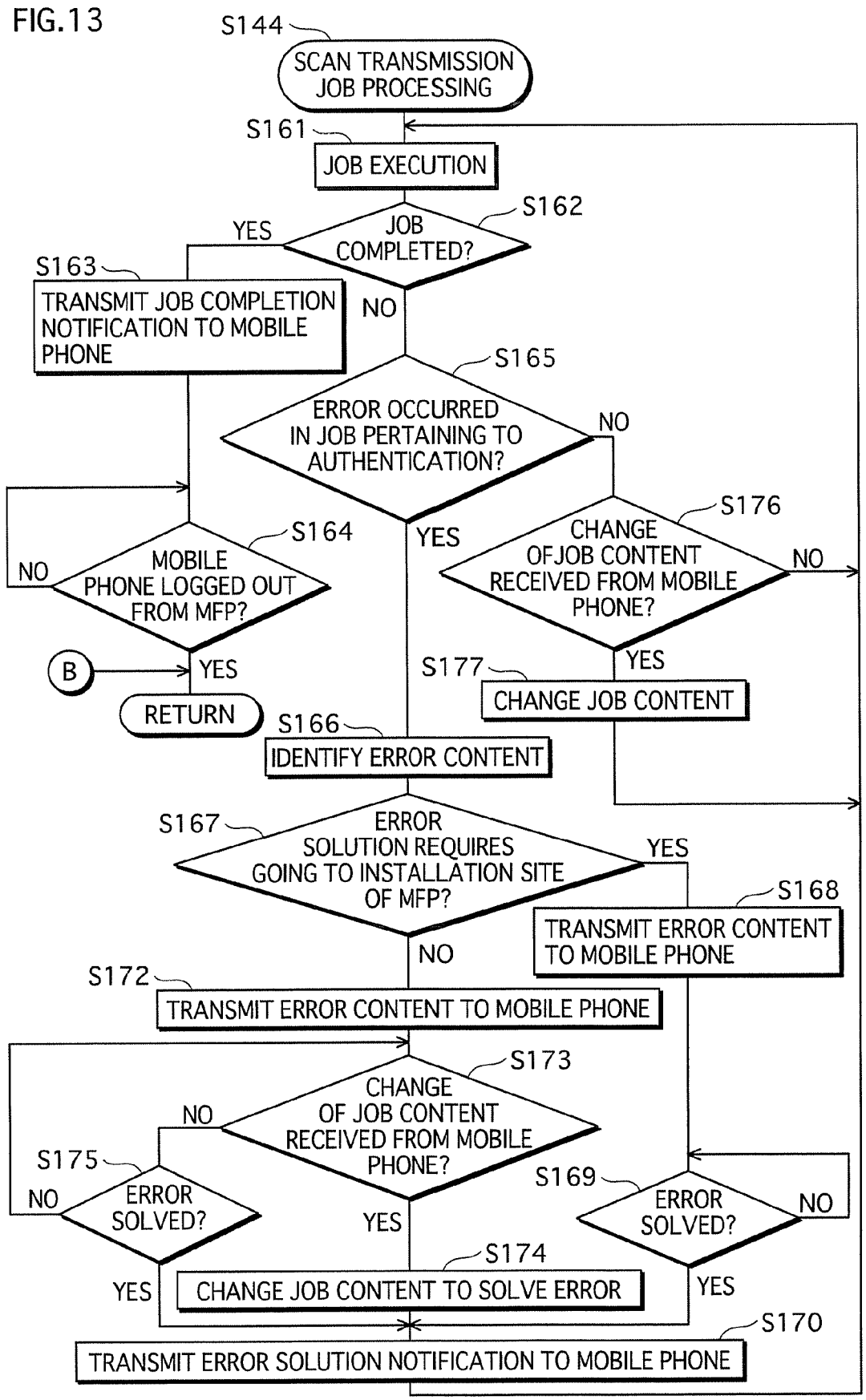
FIG. 13 is a flowchart showing scan transmission job processing pertaining to embodiment 1.

The following describes an example of the scan transmission job processing (S144) pertaining to embodiment 1 with reference to FIG. 13.

In the scan transmission job processing, the job received from the client is executed by mainly the job controller 349 (S161). When processing of the job has been completed (S162: YES), a notification that the job has been completed (job completion notification) is transmitted to the mobile phone 9 in possession of the client with use of, for example, a mail (S163).

Upon seeing the job completion notification that the mobile phone 9 has received, the client performs an operation (transmits to the MFP 3a a notification for logout) for ending the communication (login state) with the MFP 3a since the job request has been completed.

In accordance with this operation, when the MFP 3a receives the notification that the mobile phone 9 has logged out (S164: YES), processing moves to the return of FIG. 10 (authentication processing ends), and further proceeds to step S102 of FIG. 9. Note that if the notification that the mobile phone 9 has logged out is not received in step S164, the MFP 3a waits until the mobile phone 9 logs out (S164: NO).

On the other hand, if the job has not been completed in step S162 (S162: NO, the job completion notification has not been received from the job manager 355), the MFP 3a determines whether an error has occurred in the job pertaining to the authentication of the mobile phone 9 (S165) This judgment is performed by making an inquiry to the job manager 355.

If an error has occurred (S165: YES), the error content is identified (S166). If the content pertains to an error that cannot be solved without performing operations at the installation site of the MFP 3a (e.g., problems with the MFP 3a itself, such as a recording sheet jam, or toner shortage) (S167: YES), the error content is transmitted to the mobile phone 9 (S168), and processing moves to step S169.

In step S169, a judgment whether the error that occurred in the MFP 3a has been solved is performed.

Here, the client who was informed of the error content by the mobile phone 9, or another person handles the cause of the error in the MFP 3a. Once the error has been solved, processing moves to the YES branch of step S169, and then proceeds to step S170.

After an error solution notification indicating that the error has been solved is transmitted to the mobile phone 9 with use of a mail, processing moves to step S161, and for example, the above-described steps S162, S163, and S164 are performed.

On the other hand, the error content is transmitted to the mobile phone 9 (S172) if in step S167 the error can be solved without going to the installation site of the MFP 3*a* (S167: NO).

Here, an error that "can be solved without going to the installation site of the MFP 3*a*" refers to, for example, failed transmission in a case of attaching scanned data to a mail and transmitting the mail to the transmission destination "A" as shown in FIG. 2.

The client who has viewed the above error content transmits, from the mobile phone 9 to the MFP 3*a*, a modification to the job content such that the error is solved. Note that the modification to the content referred to here includes suspending transmission of the mail with the scanned data attached, and instead transmitting the scanned data by FAX. Other examples of modifications to the content are described later.

Upon receiving the change of job content from the mobile phone 9 in step S173 (S173: YES), first the job content is changed to solve the error (S174), and thereafter processing proceeds to step S170. Note that step S170 and the next step are the same as described above.

If a job content change for solving the error is not received from the mobile phone 9 in step S173 (S173: NO), processing proceeds to step S175, and whether the error has been solved is judged. Processing returns to step S173 if the error has not been solved (S175: NO), and processing proceeds to step S170 if the error has been solved (S175: YES).

If an error has not occurred in the job pertaining to the authentication in step S165 (S165: NO), the MFP 3*a* for example enters a job processing order wait state. When a change of job content is received from the mobile phone 9 in step S176 (S176: YES), the job content is changed so as to reflect the received change of job content (S177), and processing proceeds to step S161. If a change of job content is not received from the mobile phone 9 (S176: NO), processing proceeds to step S161 and waits for the job to be processed.

(2.2) Print Job Processing

FIG. 13 can also express a flowchart of the print job processing.

First, in step S161, the print job received from the client or one of the client terminals is executed.

Also, if the error that occurred can be solved without going to the installation site of the MFP 3*a* in step S167 (S167: NO), the content of the error is transmitted to the mobile phone 9 (S172).

Here, the error that "can be solved without going to the installation site of the MFP 3*a*" includes running out of designated recording sheets when executing the print job.

The client who has viewed such error content transmits, from the mobile phone 9 to the MFP 3*a*, a change of job content such that the error is solved. Here, the change of job content includes changing the size of the recording sheet from, for example, "A4" size to "B5" size.

Note that by performing such processing, the client can manipulate the job from the mobile phone 9 while away from the MFP 3*a* before going to the MFP 3*a*, and solve an error faster than, for example, a case in which only the content of the error is transmitted to the mobile phone 9, thereby improving convenience.

3.2 Mobile Phone (1) Overall Operations

Figure 14:
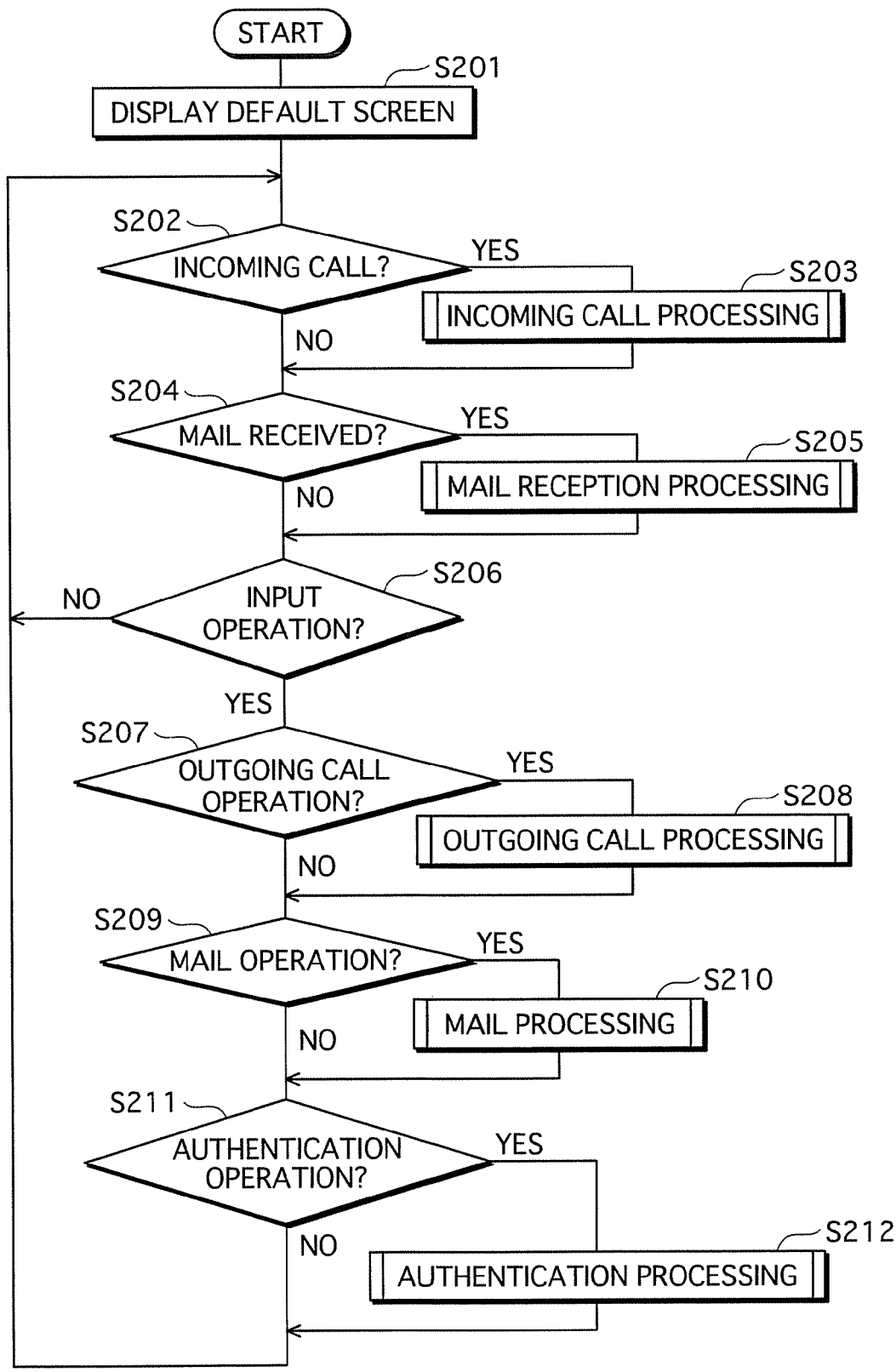
FIG. 14 is a flowchart showing processing of the mobile phone pertaining to embodiment 1.

The following describes an example of operations of the mobile phone 9 pertaining to embodiment 1 with reference to FIG. 14.

First, the controller 911 causes the display 903 to display a default screen (S201), and processing then moves to the next step.

If an incoming call is received in step S202 (S202: YES), the controller 911 causes the calling controller 917 to perform incoming call processing (S203), and if an incoming call is not received (S202: NO), processing moves to step S204.

A detailed description of the incoming call processing (S203) has been omitted since it is the same as conventionally known processing. However, incoming call processing involves, for example, when there is an incoming call, alerting the user of the incoming call by the speaker 907 or the oscillator 916, displaying the other party's phone number and name on the display 903, and communicating with the other party.

If a mail is received in step S204 (S204: YES), the controller 911 causes the communication controller 933 to perform mail reception processing (S205), and if a mail is not received (S204: NO), processing moves to step S206.

A detailed description of the mail reception processing (S205) has been omitted since it is the same as conventionally known processing. However, mail reception processing involves, for example, when a mail is received, alerting the user of the mail reception by the speaker 907 or the oscillator 916, receiving the mail body automatically or based on a user operation, and storing the received mail body to the memory 913.

If the input acquirer 929 receives input from the operation part 901 in step S206, that is, if a user input operation on the operation part 901 is received (S206: YES), processing moves to step S207, and if a user input operation is not received (S206: NO), processing returns to step S202.

If the operation content of step S206 is related to an outgoing call operation in step S207 (S207: YES), the controller 911 causes the calling controller 917 to perform outgoing call processing (S208), and if the operation content is not related to an outgoing call operation (S207: NO), processing moves to step S209.

A detailed description of the outgoing call processing (S208) has been omitted since it is the same as conventionally known processing. However, outgoing call processing involves, for example, successively displaying, on the display 903, numbers received by key input from the user, dialing the received numbers, and calling the other party.

In step S209, if the operation content of step S206 is related to a mail operation (S209: YES), the controller 911 causes the communication controller 933 to perform various mail operations related to mail (S210), and if the operation content is not related to a mail operation (S209: NO), processing moves to step S211.

A detailed description of the mail processing (S210) has been omitted since it is the same as conventionally known processing. However, mail processing involves, for example, storing text created by user input to a mail body, transmitting the mail, and deleting sent and received mail from the memory 913.

In step S211, if the operation content of step S206 is related to authentication processing (S211: YES), the main controller 911 causes the authentication controller 922 to perform authentication processing (S212), and if the operation content is not related to authentication processing (S211: NO), processing returns to step S202.

(2) Authentication Processing

Figure 15:
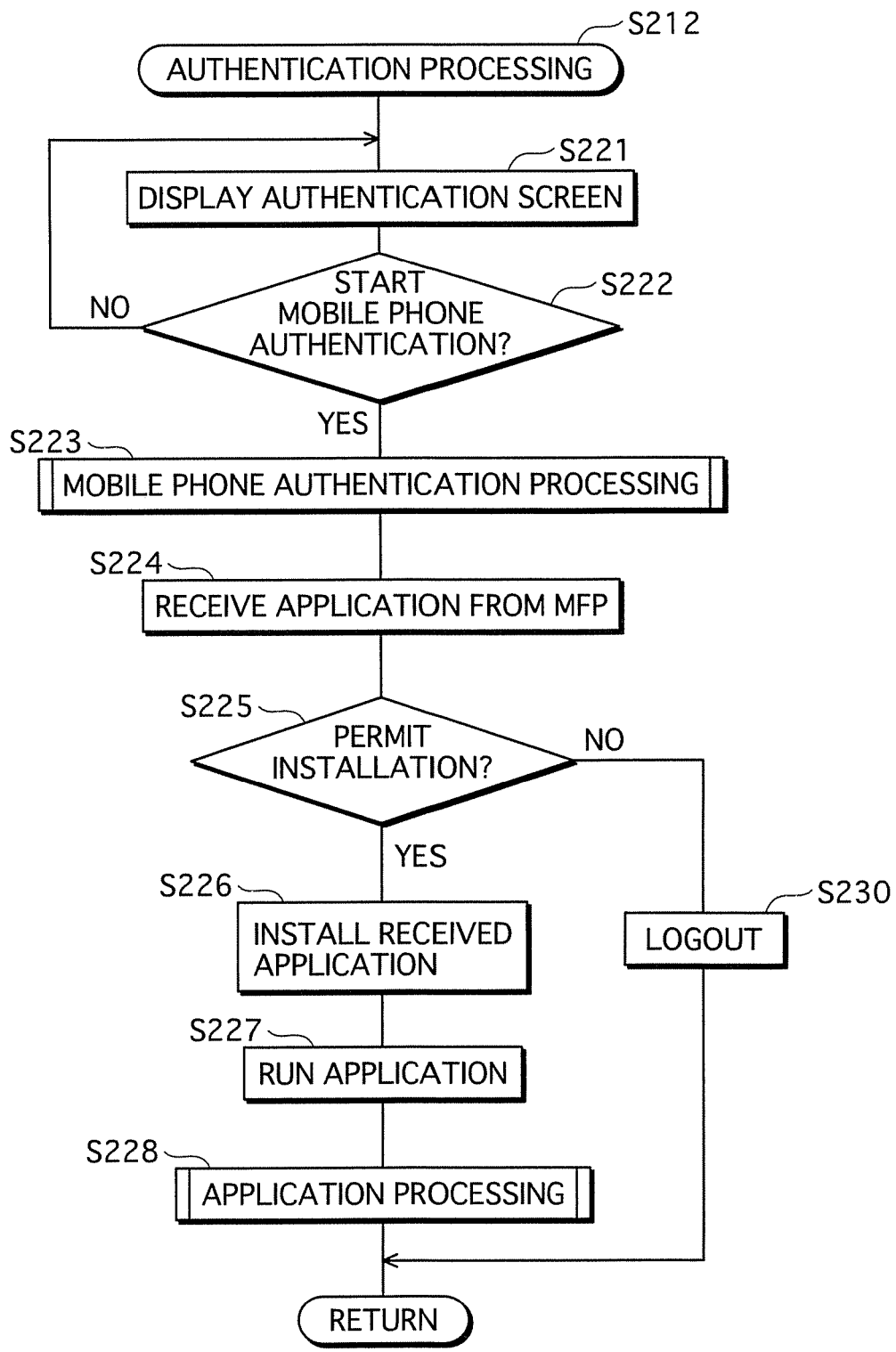
FIG. 15 is a flowchart showing the authentication processing pertaining to embodiment 1.

The following describes an example of authentication processing pertaining to embodiment 1 with reference to FIG. 15.

The main controller 912 controls the input acquirer 929 to receive an operation pertaining to an authentication operation from the client in step S206 of FIG. 14, and thereafter controls the display controller 927 to cause the display 903 to display the authentication screen (S221). The authentication screen includes a guidance screen displayed to the client in order for the MFP 3a to authenticate the mobile phone 9. Here, the authentication screen also includes an option to start the authentication processing.

When the client performs an operation (e.g., performs input using an input key) for instructing the authentication to begin in accordance with the screen displayed on the display 903 (S222: YES), processing moves to step S223 in which mobile phone authentication processing is performed with the mobile phone 9.

Figure 16:
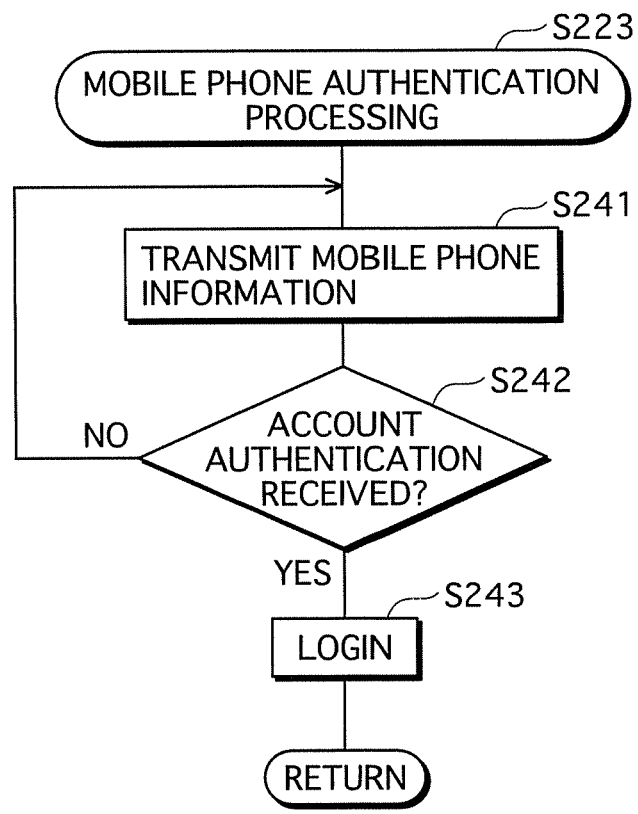
FIG. 16 is a flowchart showing mobile phone authentication processing pertaining to embodiment 1.

The following describes an example of the mobile phone authentication processing (S223) pertaining to embodiment 1 with reference to FIG. 16.

When the mobile phone authentication begins in step S222 of FIG. 15, the client brings the IC part 909 of the mobile phone 9 close to the IC reader 313a of the authenticator 313 of the MFP 3a. The authentication controller 922, the communication controller 933, and the like wirelessly transmit mobile phone information (in the present embodiment, the client's name, password, and the mail address of the mobile phone 9) that is recorded on the IC chip of the mobile phone 9 (S241).

Here, upon receiving the aforementioned name, password and mail address, the MFP 3a performs an account check with respect to the received name and password (i.e., judges whether the name and password are registered in the account database 337 as a client for whom login is permitted), and if the account is authenticated, the MFP 3a transmits a notification of account authentication to the mobile phone 9 (steps S133, S134 and S135 of FIG. 10).

In step S242, when the authentication controller 922 receives the account authentication notification via the mail controller 919, communication controller 933, and the like (S242: YES), the mobile phone 9 enters a login state (S243), and processing returns and moves to step S224 of FIG. 15.

Here, the MFP 3a receives the type of the job that the client is registering, and transmits an application corresponding to the job type to the mobile phone 9 (S S142 of FIG. 10).

The application controller 922 receives the application from the MFP 3a (S224), controls the display controller 927 to display, on the display 903, an option to permit installation of the received application, and installs the received application if permission to install the application is received from the client (S225: YES).

After the installation has been completed, the installed application is run, and application processing is performed (S228). Note that in the present embodiment, there are two types of application that can be received from the MFP 3a, namely a scan transmission job application and a print job application. Processing of these applications is described in the next section.

On the other hand, if installation of the application is not permitted in step S225, that is, in the case of not installing the application (S225: NO), logout, which means ceasing communication with the MFP 3a, is performed (S230), and thereafter processing returns and proceeds to step S202 of FIG. 14.

(3) Application Processing

Figure 17:
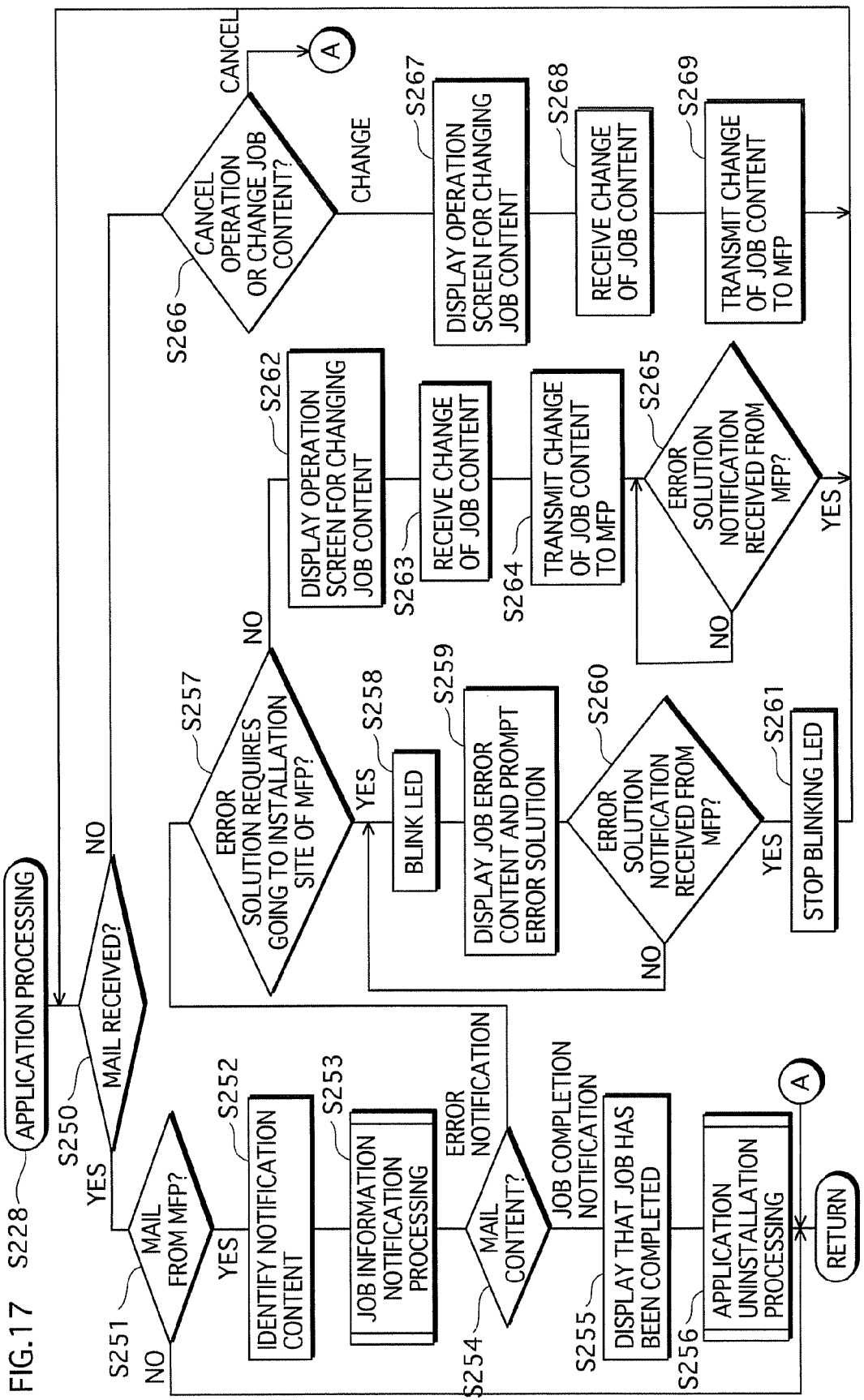
FIG. 17 is a flowchart showing application processing pertaining to embodiment 1.

The following describes an example of application processing (for a print job) pertaining to embodiment 1 with reference to FIG. 17.

First, the application controller 923 judges whether a mail has been received (S250). If a mail has been received (S250: YES), the application controller 923 judges whether the received mail is from the MFP 3a (S251). Note that the judgment is performed using a field of the mail header, that is, using the address of the sender.

In step S251, if the received mail is from the MFP 3a (S251: YES), notification content of the mail is identified (S252), and job information notification processing is performed (S253).

Figure 18:
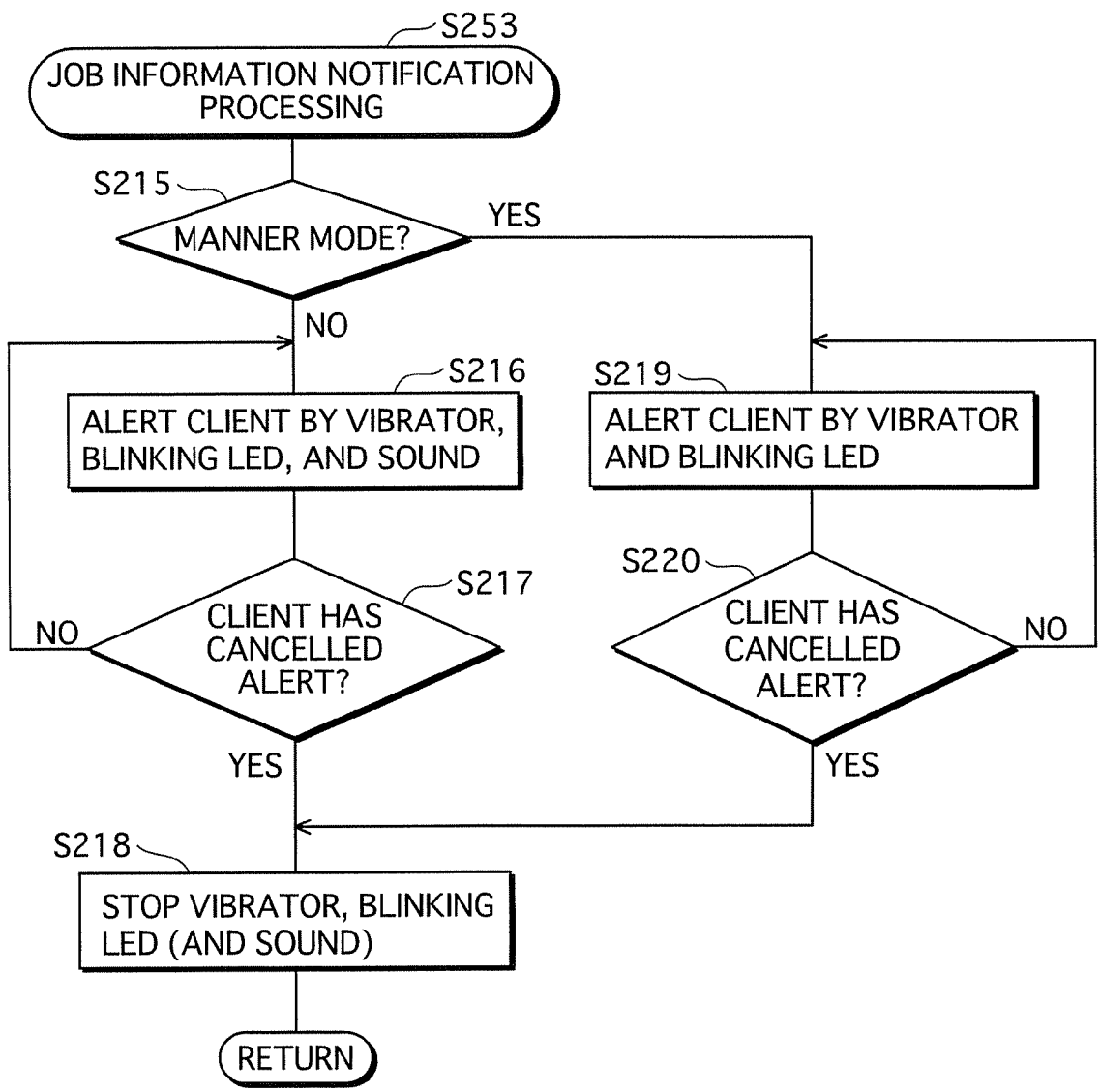
FIG. 18 is a flowchart showing job information notification processing pertaining to embodiment 1.

The following describes an example of the job information notification processing (S253) pertaining to embodiment 1 with reference to FIG. 18.

First, whether the alert setting of the mobile phone 9 is in manner mode is judged (S215). If the mobile phone 9 is not set to manner mode (S215: NO), the client is alerted of the received mail using the vibrator, a blinking alert LED, and a sound (hereinafter, these are comprehensively called an "alert") (S216).

The alert continues until the client acknowledges the alert and stops the alert in step S217. In other words, if an operation of the operation part 901 indicating stopping of the alert is not received from the client (S217: NO), processing returns to step S216, and the alert continues.

If an operation of the operation part 901 indicating stopping of the alert is received from the client (S217: YES), processing moves to step S218, the vibrator, the blinking alert LED, and output of the sound are stopped, and processing returns and moves to step S254 of FIG. 17.

On the other hand, if it is judged in step S215 that the mobile phone 9 is set to manner mode (S215: YES), the client is alerted of the received mail using the vibrator and the blinking alert LED (hereinafter, these are also called the "alert") (S219).

The alert continues until the client acknowledges the alert and stops the alert in step S220. In other words, if an operation of the operation part 901 indicating stopping of the alert is not received from the client (S220: NO), processing returns to step S219, and the alert continues.

If an operation of the operation part 901 indicating stopping of the alert is received from the client (S220: YES), processing moves to step S218, the vibrator and the blinking alert LED are stopped, and processing returns and moves to step S254 of FIG. 17.

In step S254 of FIG. 17, judgment is performed to judge whether the content of the mail from the MFP 3a is a job completion notification transmitted when execution of the job has been completed, or an error notification transmitted when an error has occurred during job execution (S254).

If the mail content is a job completion notification, the display control part 927 is controlled to display "job has been completed" on the display 903 (S255), and application uninstallation processing is performed (S256).

Figure 19:
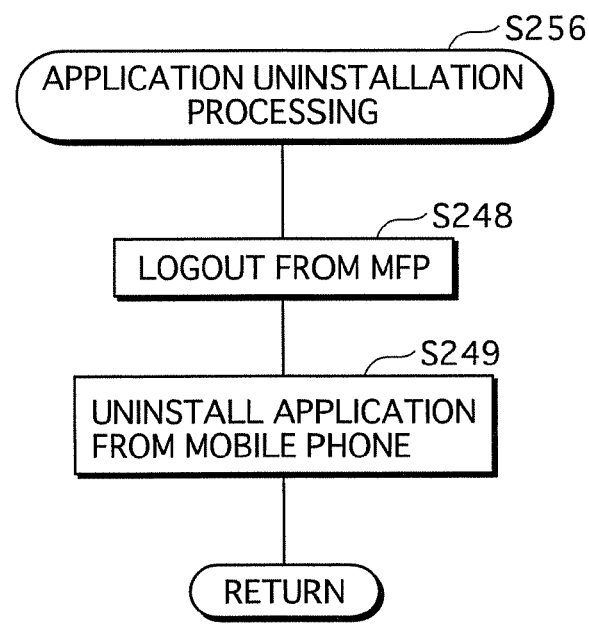
FIG. 19 is a flowchart showing application uninstallation processing pertaining to embodiment 1.

The following describes and example of the application uninstallation processing pertaining to embodiment 1 with reference to FIG. 19.

In step S248, the mobile phone 9 is logged out from the MFP 3a, and the application installed to the mobile phone 9 in order to manipulate the job pertaining to the authentication is uninstalled (S249), and processing returns to step S256 of FIG. 17. Note that the return to step S256 of FIG. 17 leads to the ending of the application processing of step S256 of FIG. 15, and the ending of the authentication processing of step S212 of FIG. 14, and ultimately, processing moves to step S202 of FIG. 14.

Returning now to FIG. 17, if the content of the mail from the MFP 3a is judged in step S254 to be an error notification, and furthermore the error content pertains to an error that requires going to the installation site of the MFP 3a in order to be solved (e.g., recording sheet jam, toner replacement) (S257: YES), the LED that is one of the alerts is blinked (S258) to alert the client, and the display controller 927 is controlled to display "JOB ERROR CONTENT & ERROR SOLUTION" on the display 903 (S259).

When the client who saw the aforementioned display or a person close to the MFP 3a has solved the error that occurred in the MFP 3a, the MFP 3a judges in step S169 of FIG. 13 that the error has been solved, and an error solution notification is transmitted from the MFP 3a to the mobile phone 9 in step S170.

Upon receiving the error solution notification, the mobile phone 9 stops the blinking LED (S261), and processing moves to step S250.

Also, if in step S257 the error content pertains to an error that can be solved without going to the installation site of the MFP 3a (e.g., running out of designated recording sheets) (S257: NO), the display controller 927 is controlled to display a job change operation screen on the display 903 (S262).

When the client who saw the aforementioned display performs an operation for changing a job setting (e.g., switching the recording sheet from "A4" to "B4"), the input acquirer 929 receives the operation content (S263). The received content change is transmitted to the MFP 3a (S264).

Note that when the error is solved by the MFP 3a reflecting the changes in content in step S174 of FIG. 13, the error solution notification is transmitted to the mobile phone 9 (S170).

When the mobile phone 9 receives the error solution notification (S265: YES in FIG. 17), processing moves to step S250. Note that if the error solution notification is not received, processing returns to step S265 such that the mobile phone 9 waits for reception thereof, and whether or not the notification has been received is judged again (S265: NO).

On the other hand, if the received mail is not from the MFP 3a, processing returns such that the mail reception processing of step S205 of FIG. 14 is performed, since the received mail is a normal mail (S251: NO). Note that as described above, the return after step S256 of FIG. 17 ultimately leads to step S202 of FIG. 14.

If an input operation indicating operation cancellation ("CANCEL" of step S266) is received while a mail has not been received in step S250 (S250: NO), that is, if the client has stopped manipulating the job from the mobile phone, or is changing the execution content of the job, processing moves from A to return.

If an input operation instructing a job content change is received ("CHANGE" of step S266), the display controller 927 is controlled to display an operation screen for job content change on the display 903 (S267).

When the client who saw the aforementioned display performs an operation to change the job content, such as changing the number of print sets from "1" to "5", the input acquirer 929 receives the operation content (S268). The received content change is transmitted to the MFP 3a (S269), and processing moves to step S250.

(4) Application Processing

Although the application processing described using FIG. 17 is for a print job, application processing for a scan transmission job is substantially the same as the application processing for a print job.

Since the type of job to be executed is different in these two types of application processing, there are differences in changes to the content of the jobs and the content of errors. Due to these differences, the display content of the display 903 is different in steps S262 and S267 of FIG. 17, the content received from the client is different, and content changes transmitted to the MFP are of course different.

The following describes differences between the print application and the scan transmission application pertaining to embodiment 1 with reference to FIG. 20.

As shown in FIG. 20, in step S262 (display performed when an error has occurred), the print job application displays change print size, change color/monochrome, and change resolution, whereas the scan transmission job application displays change transmission destination, change transmission method, change color/monochrome, and change resolution.

On the other hand, in step S267 (display performed for changes before job execution), the print job application displays change print size, change color/monochrome, change resolution, change number of print sets (number of print copies), change number of print sheets, and change sort, whereas the scan transmission job application displays change transmission destination, change transmission method, change color/monochrome, change resolution, and change file format. Note that in addition to performing such displays, input operations pertaining to these changes are received from the client.

(5) Another Example

In the above example, as shown in FIG. 2, an error occurs during execution of a job by the MFP 3a, and in order to manipulate the job, a job content change is transmitted to the MFP 3a based on a notification of the error content. However, a change to the job content can be transmitted to the MFP 3a even if an error has not occurred.

The following describes another example pertaining to embodiment 1 with reference to FIG. 21.

Note that since portions of the content of FIG. 21 are the same as in FIG. 2, descriptions of such portions will be brief.

First, as shown in FIG. 21, the client who wishes to send a job request goes to the installation site of the MFP 3a, and login authentication is performed between the mobile phone 9 of the client and the MFP 3a (shown as "1" in the figure).

After login authentication has been performed, the client registers a job to be executed by the MFP 3a (shown as "2" in the figure). Here, the job to be registered is a print job in which the print size is "A4", and the number of print sets is "3".

Upon receiving the job registration (print job) from the client, the MFP 3a transmits, to the mobile phone 9, an application to be used in relation to the registered job (shown as "3" in the figure). The mobile phone 9 receives the application, and installs the received application (shown as "4" in the figure).

Next, the client sends a print job request (outputs data pertaining to the print job) from the client terminal to the MFP 3a.

In the case of making a change to content of the print job before execution by the MFP 3a (e.g., there is a need to change the number of print sets from "3" to "5"), the client transmits an instruction to change the number of print sets from the mobile phone 9 (shown as "11" in the figure).

The MFP 3a that received the instruction changes the number of print sets of the print job pertaining to the authentication to "5" and executes the job (shown as "12" in the figure), and upon completing the job, transmits a job completion notification to the mobile phone 9 (shown as "13" in the figure).

This enables the client to find out from the mobile phone 9 that the print job whose number of print sets was changed has been completed, and the mobile phone 9 uninstalls the application that is no longer necessary since the job request sent to the MFP 3a has been completed (shown as "14" in the figure).

Note that the aforementioned example is implemented by steps S250 (S250: NO), S266 (S266: CHANGE), S267, S268, and S269 of FIG. 17.

As mentioned above, even if, for example, there is a need to give an instruction to the MFP 3a, the client can manipulate the job request sent to the MFP 3a without the trouble of going to the installation site thereof and returning to the installation site of one of the client terminals 5a to 5c. Also, the client can send an instruction (job manipulation) from the mobile phone 9 to the MFP 3a after sending a job request even if he/she has moved away from the MFP 3a and the client terminals 5a to 5c.

Also, the application that is installed in the mobile phone 9 is uninstalled after the job has been completed, thereby eliminating the need to increase the memory capacity of the mobile phone 9.

Furthermore, since the present embodiment employs a structure in which applications to be installed in the mobile phone 9 are acquired from the MFP 3a per job request, if, for example, the software of the MFP 3a is upgraded, the mobile phone 9 can acquire an upgraded version of the application from the MFP 3a.

Also, the present embodiment provides a sense of reassurance in terms of security, mistaken operations and the like since the MFP 3a receives an operation pertaining to a job from a client who has been authenticated with respect to the job.

Embodiment 2

Although in the other example of embodiment 1, content changes etc. as shown in FIG. 21 are assumed to be operations that can be performed from the mobile phone with use of the print job application, in embodiment 2, there are descriptions of cases of changing the MFP that is to perform print output and cancelling a job, which are changes to content not shown in FIG. 21. Note that since portions of the content of FIG. 22 are the same as in FIG. 2, descriptions of such portions will be brief.

Figure 22:
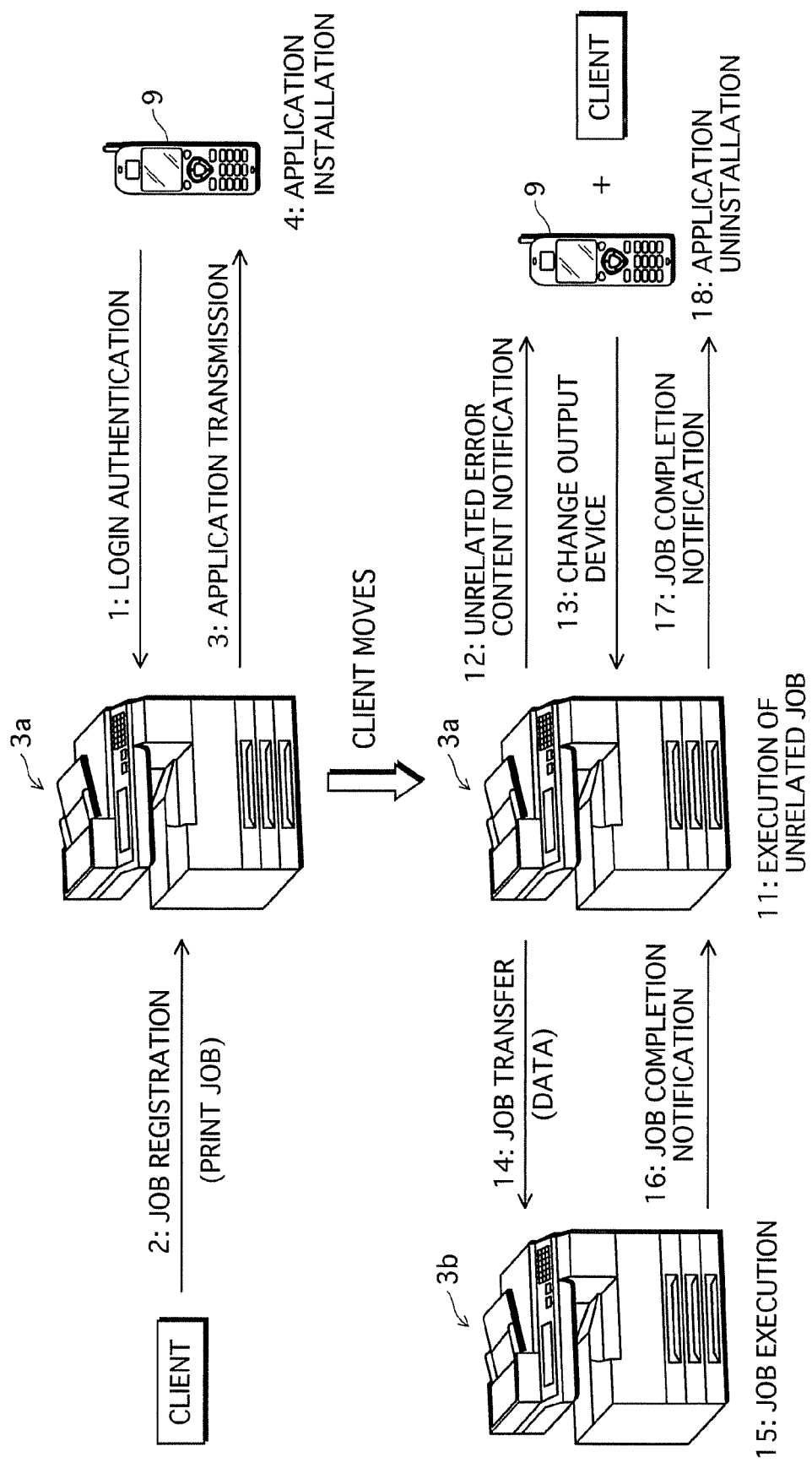
FIG. 22 describes exemplary processing of embodiment 2.

First, as shown in FIG. 22, the client goes to the installation site of the MFP 3a, and login authentication is performed between the mobile phone 9 of the job request sender and the MFP 3a (shows as "1" in the figure).

After login authentication has been performed, the client registers a job to be executed by the MFP 3a (shown as "2" in the figure). Here, the job to be registered is a print job in which the print size is "A4", and the number of print sets is "3".

Upon receiving the job registration (print job) from the client, the MFP 3a transmits, to the mobile phone 9, an application to be used in relation to the registered job (shown as "3" in the figure). The mobile phone 9 receives the application, and installs the received application (shown as "4" in the figure).

Next, the client sends a print job request (outputs data pertaining to the print job) from the client terminal to the MFP 3a. If an error has occurred during execution of another person's job before execution of the job from the client terminal (shown as "11" in the figure), the MFP 3a notifies the content of the error to the mobile phone 9 (shown as "12" in the figure).

The client can find out the content of the error from the mobile phone 9, and transmit, from the mobile phone 9, an instruction to change the original print output device, namely the MFP 3a, to another output device, namely the MFP 3b (shown as "13" in the figure).

The MFP 3a receives the instruction, and transfers the print job pertaining to the authentication to the MFP 3b (transmits the print data) (shown as "14" in the figure). In accordance with the job transfer, the print job is executed by the MFP 3b (shown as "15" in the figure), and a notification that the job has been completed is transmitted to the MFP 3a (shown as "16" in the figure).

The MFP 3a receives the notification, and transmits a job completion notification to the mobile phone 9 (shown as "17" in the figure). This enables the client to find out from the mobile phone 9 that the job has been completed, and the mobile phone 9 uninstalls the application that is no longer necessary since the job request sent to the MFP 3a has been completed (shown as "18" in the figure).

As mentioned above, even if, for example, there is a need to give an instruction to the MFP 3a, the client can send an instruction to the MFP 3a without the trouble of going to the installation site thereof and returning to the installation site of one of the client terminals 5a to 5c. Also, the client can send an instruction from the mobile phone 9 to the MFP 3a after sending a job request even if he/she has moved away from the MFP 3a and the client terminals 5a to 5c.

While the structures of the MFP 3a, the client terminals 5a to 5c, and the mobile phone 9 are basically the same as the corresponding structure described in embodiment 1, the print job application of the present embodiment differs from that of embodiment 1.

Figure 23:
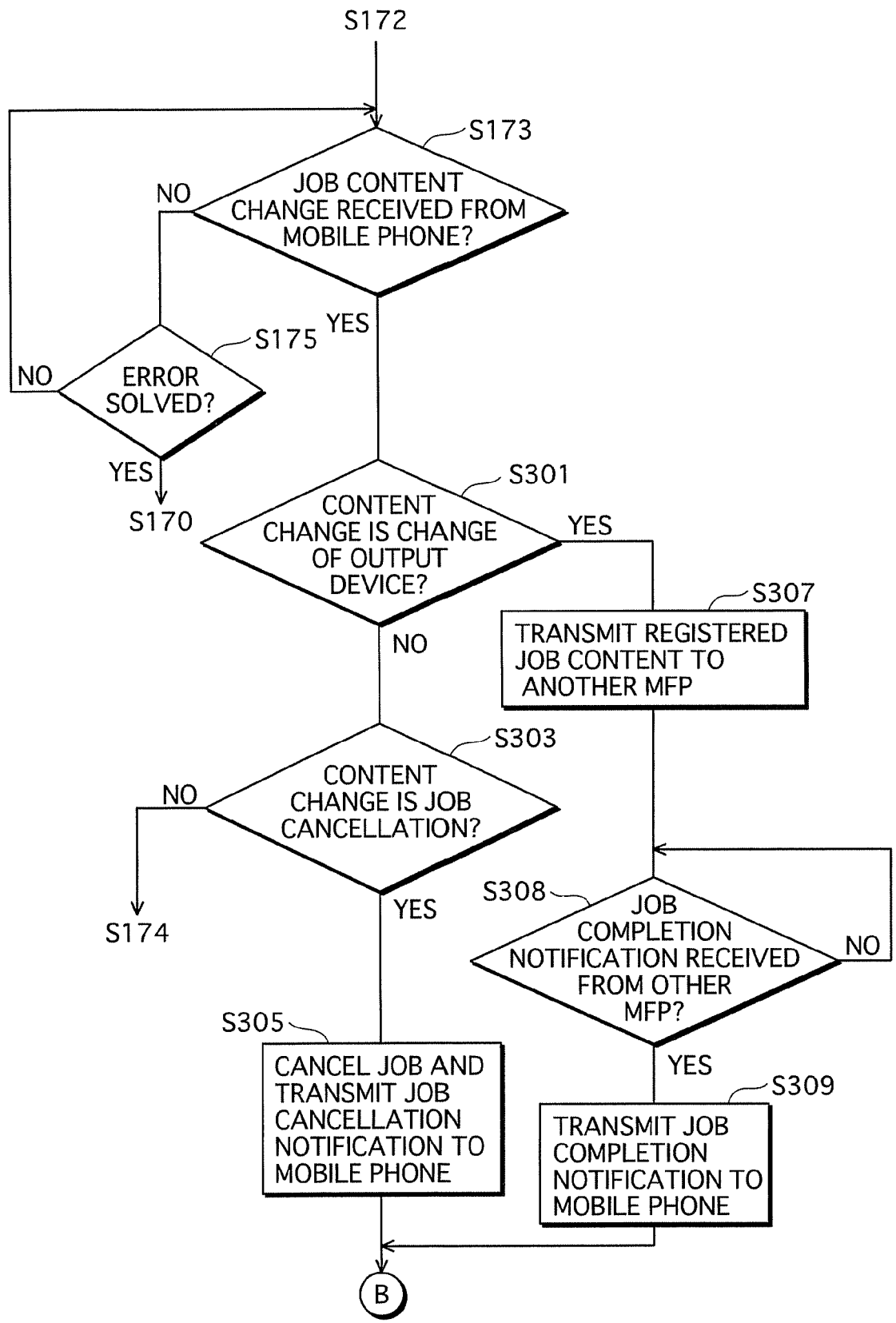
FIG. 23 is a flowchart showing print job processing pertaining to embodiment 2.

The following describes print job processing of an application pertaining to embodiment 2 with reference to FIG. 23.

Only a portion of the flowchart of FIG. 23 differs from the flowchart of FIG. 13, and the following describes the differing portion. Note that in the following description of the present embodiment, it is assumed that the change of job content from the mobile phone 9 is a change of print output device, that is to say, it is assumed that the MFP 3a has received a notification instructing a change of MFP.

In step S173, when a change of job content is received from the mobile phone 9 (S173: YES), the MFP 3a judges whether the content change is "change output device" (S301). If the result of the judgment is that the content change is not "change output device" (S301: NO), the MFP 3a judges whether the content change is "cancel job" (S303).

If the result of the judgment of step S303 is affirmative (S303: YES), the MFP 3a cancels the print job and transmits a notification of the cancellation to the mobile phone 9 (S305), and processing returns to FIG. 10 through FIG. 13.

Note that if the result of the judgment of step S303 is negative (S303: NO), processing moves to step S174 of FIG. 13, and the processing of S174 and thereafter is performed.

Also, if the content change is a change of output device in step S301 (S301: YES), the MFP 3a transmits the content of the registered job to another MFP (here, the MFP 3b) (S307).

The MFP 3a judges whether a job completion has been received from the MFP 3b to which the job was transferred (S308). The job completion notification indicates that the print job transmitted in step S307 has been completed. If the job completion notification has been received (S308: YES), the MFP 3a transmits the job completion notification to the mobile phone 9 (S309), and processing returns to FIG. 10 through FIG. 13.

Embodiment 3

In embodiments 1 and 2, if an error occurs during execution of the job from the client, a change to the job content is instructed from the mobile phone in order to handle the error. However, the job of the MFP may be manipulated using the mobile phone even if an error has not occurred in the MFP. In embodiment 3, since cancellation of a job and changing of the output device are possible, even if there is an error that cannot be solved without going to the installation site of the MFP, such an error can be avoided using the mobile phone.

Figure 24:
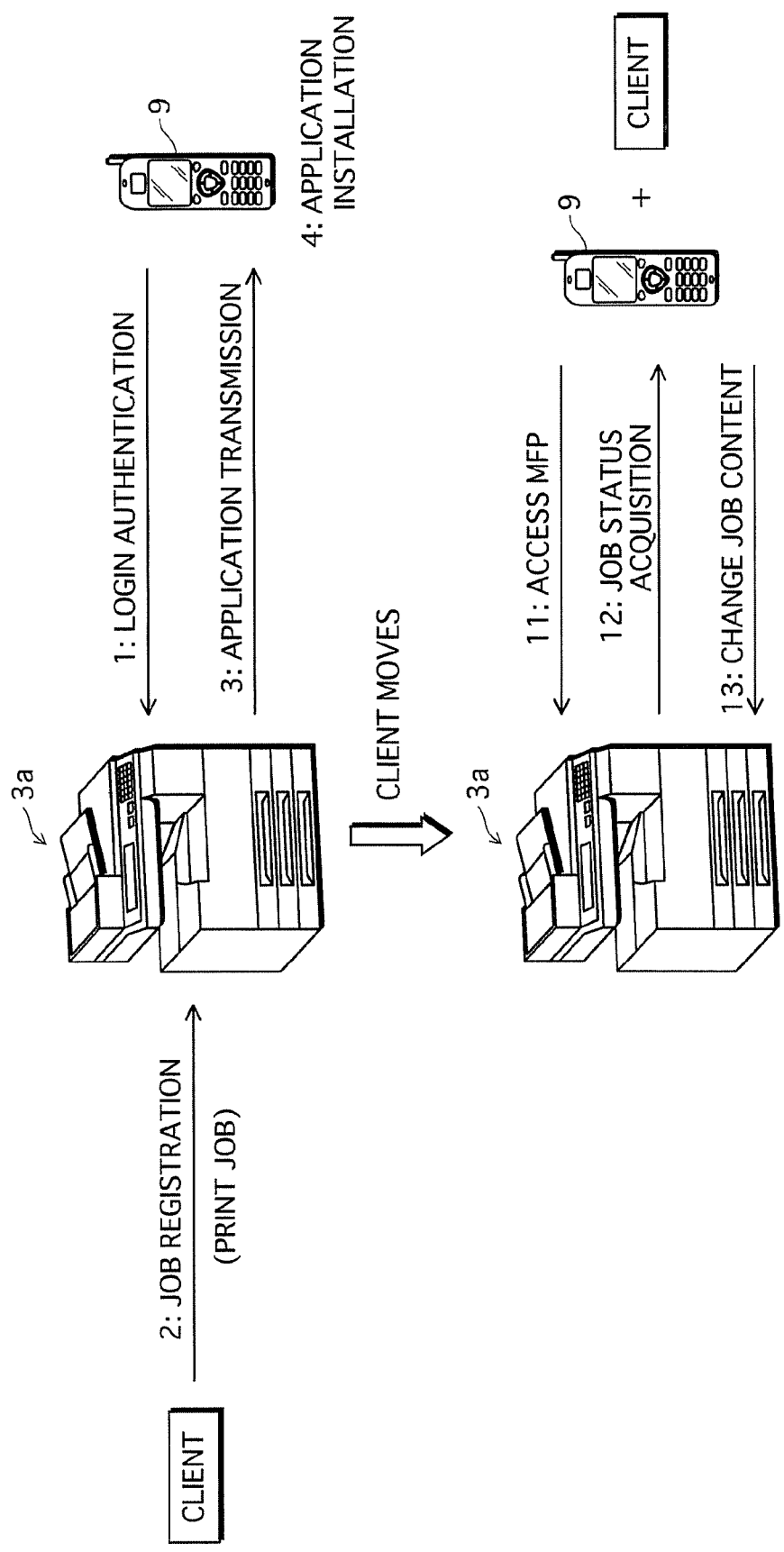
FIG. 24 describes exemplary processing of embodiment 3.

The following describes an example of processing pertaining to embodiment 3 with reference to FIG. 24. Note that since portions of the content of FIG. 24 are the same as in FIG. 22 of embodiment 2, descriptions of such portions will be brief.

First, as shown in FIG. 24, the client goes to the installation site of the MFP 3a, and login authentication is performed between the mobile phone 9 of the job request sender and the MFP 3a (shown as "1" in the figure).

After login authentication has been performed, the client registers a job to be executed by the MFP 3a (shown as "2" in the figure). Here, the job to be registered is a print job in which the print size is "A4", and the number of print sets is "3".

Upon receiving the job registration (print job) from the client, the MFP 3a transmits, to the mobile phone 9, an application to be used in relation to the registered job (shown as "3" in the figure). The mobile phone 9 receives the application, and installs the received application (shown as "4" in the figure).

Next, the client sends a print job request (outputs data pertaining to the print job) from the client terminal to the MFP 3a.

Next, the client uses the application to access the MFP 3a in order to find out a job status (shown as "11" in the figure), and acquires the job status from the MFP 3a (shown as "12" in the figure).

If the job status indicates that, for example, the MFP 3a is executing another person's job and that execution of the client's job will take time, the client transmits an instruction to change the output device from the MFP 3a to the MFP 3b (shown as "13" in the figure).

The MFP 3a receives the instruction, and similarly to embodiment 2, performs processing for transferring the job to the MFP 3b, etc.

Figure 25:
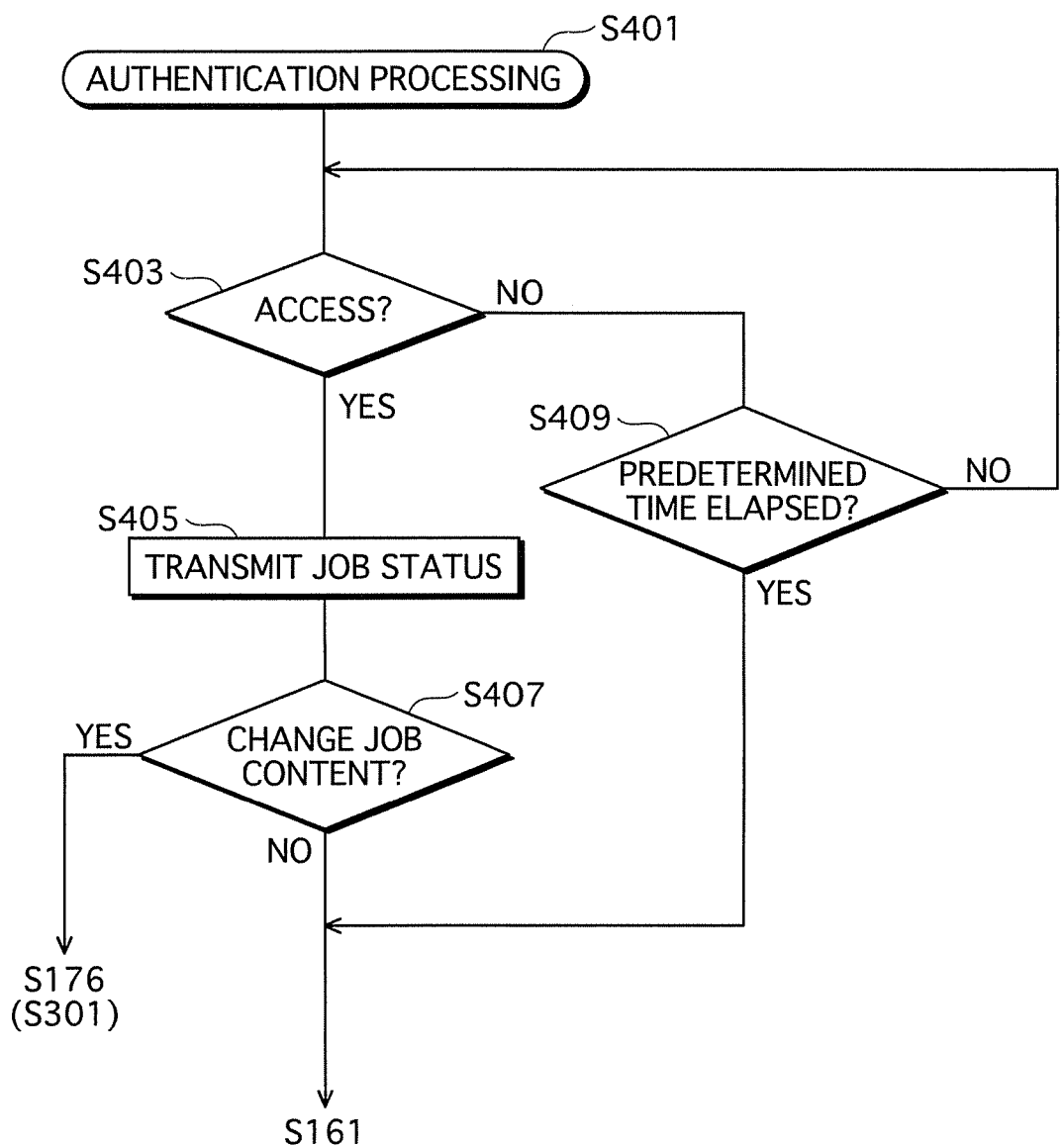
FIG. 25 is a flowchart showing authentication processing in an MFP pertaining to embodiment 3.

The following describes authentication processing (S401) in the MFP pertaining to embodiment 3 with reference to FIG. 25. Note that only a portion of the flowchart of FIG. 25 differs from the flowchart of FIG. 13 or FIG. 23, and the following describes the differing portion.

As shown in FIG. 25, first the MFP 3a judges whether access corresponding to "11" of FIG. 24 has been performed (S403). If access has been performed by the mobile phone 9 (S403: YES), the MFP 3a transmits the status of the currently received job to the mobile phone 9 (S405).

Next, the MFP judges whether an instruction to change the job content has been received from the mobile phone 9 (S407). If there has been an instruction to change the job content (S407: YES), processing moves to step S176 of FIG. 13. If on the other hand an instruction to change the job content has not been received (S407: NO), processing similarly moves to step S161 of FIG. 13. If the instruction to change the job content includes a change of output device or a job cancellation, processing may be returned to S301 of FIG. 23.

If in step S403, access has not been performed by the mobile phone 9 (S403: NO), the MFP 3a judges whether a predetermined time has elapsed (S409). If the predetermined time has not elapsed (S409: NO), processing returns to step S403, and the predetermined time has elapsed (S409: YES), access by the mobile phone 9 is considered to not have been performed, and processing moves to step S161.

Figure 26:
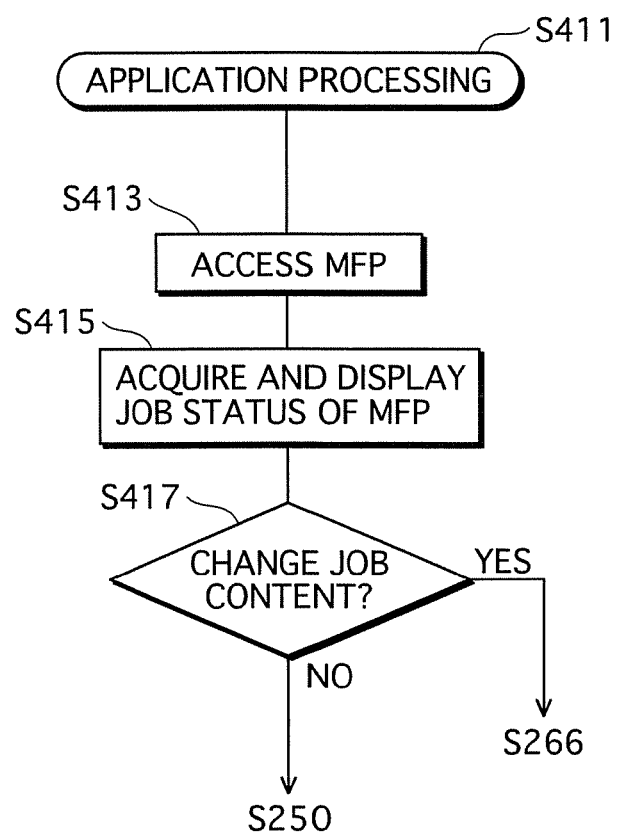
FIG. 26 is a flowchart showing application processing in a mobile phone pertaining to embodiment 3.

The following describes application processing (S411) in the mobile phone pertaining to embodiment 3 with reference to FIG. 26. Only a portion of the flowchart of FIG. 26 differs from the flowchart of FIG. 17, and the following describes the differing portion. Also, the portion described hereinafter corresponds to FIG. 25 which is a portion of the authentication processing of the MFP 3a.

As shown in FIG. 26, first the mobile phone 9 accesses the MFP 3a, which corresponds to "11" of FIG. 24. Note that this access may be performed automatically when performing the application processing, or may be performed after receiving an access instruction from the client.

Upon acquiring the job status from the MFP 3a in response to the access, the content of the job status is displayed on the display 903 (S415). If the client who saw the display performs an operation for changing the job content, the judgment of step S417 is "YES", and processing moves to step S266. In FIG. 17, if the client does not perform an operation for changing the job content, the judgment of step S417 is "NO", and processing moves to step S250.

SUMMARY

Although the present invention has been described based on the above-described embodiments, the content of the present invention is of course not limited to the specific examples shown in the embodiments. For example, the following variations can also be implemented.

1. Image Processing Apparatus and Mobile Terminal (1) Image Processing Apparatus Although an MFP is used as the image processing apparatus in the above embodiments, the image processing apparatus may be any of various types of apparatuses such as a FAX apparatus that reads a scanned original document (image), outputs a received FAX, etc., a copying apparatus that copies a scanned original document, and a printer that forms an image (may be characters, graphics, images, etc.) on a recording sheet based on electronic data. Alternatively, the image processing apparatus may be any of various types of complex apparatuses in which any of the above apparatuses have been arbitrarily combined.

(2) Mobile Terminal

Although a mobile phone is used as the mobile terminal in the above embodiments, it is sufficient for the mobile terminal to have a structure that is able to perform communication with the MFP (image processing apparatus) and that can run an application received from the MFP, display various types of information in accordance with execution of the application, receive input, and perform transmission with respect to the MFP.

In other words, a mobile phone (may be a PHS), a mobile information terminal (PDA), a smart phone combining these, or the like can be used as the mobile terminal.

Furthermore, the mobile terminal may be able to perform communication with the image processing apparatus by an independent standard rather than via a so-called telecommunication carrier. For example, Bluetooth may be used, or home RF may be used depending on the situation.

A wireless LAN may also be used. In this case, communication becomes impossible as the distance between the image processing apparatus and the mobile terminal increases. However, implementation is possible by, for example, using two or more routers and connecting the nearest router and the mobile terminal by the wireless LAN.

2. Authentication

Although wireless communication using IC chips is used for authentication between the image processing apparatus and the mobile terminal in the above embodiments, such authentication may be performed by another method. The other method may consider the mobile phone and person in possession thereof as the same, and perform fingerprint authentication or voice print authentication with the person in possession of the mobile phone, in order to authenticate the person as registered.

Also, if the mobile terminal is a mobile phone, a call may be placed from the mobile phone to the image processing apparatus, and the character input keys of the mobile phone may be used to input a password, which is then transmitted to the image processing apparatus, in order to authenticate the person as registered.

3. Authentication and Job Registration

Although job registration in the above embodiments is performed after login authentication as shown in FIG. 2, FIG. 21 and FIG. 22, login authentication may be commenced during job registration or after the job has been registered. However, if job registration is performed first, it is necessary to perform login authentication before the job is executed.

Consequently, if a print job or the like is registered before authentication, information instructing authentication to be performed is stored in print job data that is to be transmitted from the client terminal to the image processing apparatus, and the image processing apparatus that received such information need only perform authentication processing with the mobile terminal of the client that sent the print job request.

Also, in the case of performing a scan transmission job, the image processing apparatus may, for example, display a setting (e.g., transmission destination, transmission method, etc.) input screen regarding the scan transmission job on the display after reception of the job, additionally display an option to perform authentication, and receive input regarding the settings and the authentication at the same time. The image processing apparatus may also display the option to perform authentication and receive the input regarding the authentication from the client, after input of the settings has been completed.

4. Jobs (1) Job Types

Although a print job and scan transmission job have been given as examples of jobs pertaining to authentication in the above embodiments, other jobs can also be implemented. The following describes a main function of an application for another job with reference to FIG. 27.

In the example shown in FIG. 27, the MFP is provided with applications for scan jobs and print jobs, and the applications for scan jobs includes a scan to box application in addition the scan transmission job application described in the embodiments.

In addition to "change resolution", "change color/monochrome", and "change file format", "change save destination" and the like can be performed if the scan to box application is run.

(2) Content Change

Although the content changes of the above embodiments involve changes to content of jobs of the same job type, the job type itself may be changed. For example, a scan transmission job may be changed to a copy job. Specifically, transmission of a scanned original document may be cancelled, and the scanned original document may instead be printed in the form of a copy.

Note that in the case of changing the job type, an application corresponding to the new job type may be transmitted. Alternatively, the application corresponding to the new job type may not be transmitted, and content changes etc. to the new job may not be permitted.

5. Exchange Of Notifications Etc. Between Image Processing Apparatus and Mobile Terminal Although the exchange of notification between the image processing apparatus and the mobile terminal is performed using mail headers in the above embodiments, the information of the notifications etc. may be stored in, for example, a mail body. Note that although not particularly described, mail is used as a concept that includes not only so-called E-mail, but also mail in the form of a short message that is transmitted and received directly, without going through the Internet, if the telecommunication carrier of the phone of the MFP and the mobile phone is the same.

Furthermore, if the image processing apparatus and the mobile terminal are connected using a wireless LAN, the exchange of notifications may be implemented by directly transmitting information (packets) to the other device's IP address.

6. Application Software

Although screens etc. displayed when running application software is not described in the embodiments, screens corresponding to instruction content to be transmitted to the image processing apparatus and information to be received from the image processing apparatus are set in the application software.

In the image processing apparatus, if, for example, there is a shortage of "A4" recording sheets and an error occurs as described in FIG. 22, information indicating this shortage of recording sheets is associated between the image processing apparatus and the mobile terminal in advance, and the mobile terminal is programmed such that, when the information indicating this error is received, items such as "cancel job", "change recording sheet", and "load recording sheets" are displayed on the display for selection by the user.

7. Other Remarks

Although application software is uninstalled in the above embodiments without permission from the client, who is the user of the mobile phone, as shown in for example step S249 of FIG. 19, upon receiving a notification that the job related to image processing has been completed (job completion notification) from the image processing apparatus, the mobile terminal may receive, from the client, an instruction of whether to delete the application software.

The application software transmitted from the image processing apparatus to the mobile phone may be transmitted in a compressed or uncompressed form. There are no particular restrictions regarding the form of the application software.

Although an MFP (image processing apparatus) and a mobile phone (mobile terminal) have been described in the above embodiments, a program for causing the MFP and the mobile phone to execute operations such as in the above embodiments may be stored on a readable recording medium, and the recording medium may be distributed and be the subject of a transaction.

Also, the program may be distributed via a network or the like and be the subject of transaction, and be installed on the client terminal via the network. Furthermore, the program may be presented to the user by being, for example, displayed on a display apparatus or printed out as printed material.

Here, the readable recording medium may be a removable storage medium such as a floppy disk, CD, MO, DVD, or memory card, or a fixed storage medium such as a hard disk or a semiconductor memory. There are no particular restrictions regarding the recording medium.

8. Summary

The above embodiments are for resolving the issues described in section regarding conventional technology. The following is a summary of the above embodiments.

In one aspect of the above embodiments, an image processing system includes: an image processing apparatus that includes a job executor operable to receive an image processing-related job and execute the received job, an authenticator operable to authenticate that a user of a mobile terminal is registered in the image processing apparatus, a transmitter operable to transmit, to the mobile terminal of the authenticated user, a piece of application software that enables at least one operation equivalent to a user operation performed directly on the image processing apparatus in a case of execution of the job pertaining to the authenticated user, and a receiver operable to receive, from the mobile terminal, operation content of an operation performed on the job by the authenticated user with use of the piece of application software transmitted to the mobile terminal; and the mobile terminal that includes a receiver operable to receive the piece of application software, an application software executor operable to execute the received piece of application software, and a transmitter operable to transmit, to the image processing apparatus, the operation content in a case of the authenticated user performing the operation on the job with use of the application software, wherein the job executor of the image processing apparatus executes the job in accordance with the operation content received from the mobile terminal pertaining to the authentication.

The "authenticator" is not limited to using any particular authentication method as long as it is able to authenticate that the user of the mobile terminal is registered in the image processing apparatus. There are no particular restrictions on the authentication method. Also, authentication need only be performed between the mobile terminal and the image processing apparatus if the user is using a specified mobile terminal, and furthermore, authentication may be performed between the user and the image processing apparatus if the mobile terminal used by the user is not predetermined. One example of this is a case where two or more clients (senders of job requests to the image processing apparatus) are sharing fewer mobile terminals than there are clients.

In the image processing system, the application software enables at least one operation equivalent to a user operation performed directly on the image processing apparatus in a case of execution of the job pertaining to the authenticated user, and, the authenticated user can transmit, from the mobile terminal to the image processing apparatus, operation content in a case of using the mobile terminal to manipulate the job pertaining to the authentication.

According to this structure, if for example an error occurs during execution of a job in the image processing apparatus, and the error can be solved by changing the content of the job, or in a case of changing the job content before execution, the job request sender can solve the error or change the job content by operating the image processing apparatus from the mobile terminal, without the trouble of going to the installation site of the image processing apparatus.

Also, the job executor may execute a plurality of types of image processing-related jobs, and the transmitter of the image processing apparatus may transmit the piece of application software corresponding to a type of the job pertaining to the authenticated user.

According to this structure, the application software need only be able to manipulate a corresponding job, thereby reducing the memory capacity required by the application software, compared to an application for all jobs, and reducing the load on the mobile terminal.

Also, the image processing apparatus may include a part operable to transmit, to the mobile terminal, information regarding an error that has occurred in execution of the job pertaining to the authentication, the application software executor may further receive the operation for handling the error, the transmitter of the mobile terminal may transmit, to the image processing apparatus, the operation content of the received operation performed by the authenticated user for handling the error, and the job executor may execute the job in which the error has occurred, in accordance with the operation content received by the receiver of the image processing apparatus.

Here, the "part operable to transmit, to the mobile terminal, information regarding an error that has occurred in execution of the job pertaining to the authentication" may be the transmitter of the image processing apparatus, or may be separate from the transmitter.

Another aspect of the above embodiments is an image processing apparatus capable of communication with a mobile terminal and including a job executor for executing an image processing-related job, the image processing apparatus including: an authenticator operable to authenticate that a user of a mobile terminal is registered in the image processing apparatus; a transmitter operable to transmit, to the mobile terminal of the authenticated user, a piece of application software that enables at least one operation equivalent to a user operation performed directly on the image processing apparatus in a case of execution of the job pertaining to the authenticated user; and a receiver operable to receive, from the mobile terminal, operation content of an operation performed on the job by the authenticated user with use of the piece of application software transmitted to the mobile terminal, wherein the job executor of the image processing apparatus executes the job in accordance with the operation content received from the mobile terminal pertaining to the authentication.

In the image processing apparatus, the application software enables at least one operation equivalent to a user operation performed directly on the image processing apparatus in a case of execution of the job pertaining to the authenticated user, and with use of the application software, the authenticated user can transmit, from the mobile terminal to the image processing apparatus, operation content of an operation.

According to this structure, if for example an error occurs during execution of a job in the image processing apparatus, and the error can be solved by changing the content of the job, or in a case of changing the job content before execution, the job request sender can solve the error or change the job content by operating the image processing apparatus from the mobile terminal, without the trouble of going to the installation site of the image processing apparatus.

Also, the job executor may execute a plurality of types of image processing-related jobs, and the transmitter of the image processing apparatus may transmit the piece of application software corresponding to a type of the job pertaining to the authenticated user.

According to this structure, the application software need only be able to manipulate a corresponding job, thereby reducing the memory capacity required by the application software, compared to an application for all jobs, and reducing the load on the mobile terminal.

Also, the authenticator may acquire authentication information of the user of the mobile terminal directly from the mobile terminal with use of wireless communication.

This enables the user of the mobile terminal to be reliably authenticated, ensures security with respect to the leakage of an image for processing, etc., and eliminates cases such as the reception of an operation from a person who is unrelated to the job pertaining to the authentication.

Also, the piece of application software may be transmitted to the mobile terminal of the authenticated user, for execution of only the job received from the authenticated user.

This enables preventing application software from being transmitted to a mobile terminal that is unrelated to the authentication.

Also, the image processing apparatus may include a part operable to transmit, to the mobile terminal, information regarding an error that has occurred in execution of the job pertaining to the authentication, wherein the receiver may receive the operation content of the operation for handling the error, and the job executor may execute the job in which the error has occurred, in accordance with the operation content received by the receiver.

Here, the "part operable to transmit, to the mobile terminal, information regarding an error that has occurred in execution of the job pertaining to the authentication" may use the transmitter of the image processing apparatus, or may be separate from the transmitter.

Another aspect of the above embodiments is a mobile terminal capable of communication with an image processing apparatus for executing an image processing-related job, the mobile terminal including: a transmitter operable to transmit, to the image processing apparatus, authentication information necessary for authentication of a user of the mobile terminal in the image processing apparatus; a receiver operable to, when the user has been authenticated by the image processing apparatus, receive therefrom a piece of application software that enables at least one operation equivalent to a user operation performed directly on the image processing apparatus in a case of execution of the job pertaining to the authenticated user; and an application software executor operable to execute the received piece of application software, wherein the transmitter further transmits, to the image processing apparatus, operation content of an operation performed on the job by the authenticated user with use of the piece of application software.

According to this structure, if for example an error occurs during execution of a job in the image processing apparatus, and the error can be solved by changing the content of the job, or in a case of changing the job content before execution, the job request sender can solve the error or change the job content by operating the image processing apparatus from the mobile terminal, without the trouble of going to the installation site of the image processing apparatus.

Also, the mobile terminal may include a part operable to receive information regarding an error that has occurred in execution of the job pertaining to the authentication performed in the image processing apparatus, the application software executor may receive the at least one operation for handling the error in order to enable execution of the job in which the error has occurred, and the transmitter may transmit operation content of the received operation for handling the error to the image processing apparatus. Here, the "part operable to transmit, to the mobile terminal, information regarding an error that has occurred in execution of the job pertaining to the authentication" may use the transmitter of the mobile terminal, or may be separate from the transmitter.

Another aspect of the above embodiments is a recording medium having recorded thereon a program for causing an image processing apparatus, which is for executing an image processing-related job and capable of communication with a mobile terminal, to perform processing including: an authentication step of authenticating that a user of the mobile terminal is registered in the image processing apparatus; a transmission step of transmitting, to the mobile terminal of the authenticated user, a piece of application software that enables at least one operation equivalent to a user operation performed directly on the image processing apparatus in a case of execution of the job pertaining to the authenticated user; a reception step of receiving, from the mobile terminal, operation content of an operation performed on the job by the authenticated user with use of the piece of application software transmitted to the mobile terminal; and an execution step of executing the job in accordance with the operation content received from the mobile terminal pertaining to the authentication.

Also, the program may cause the image processing apparatus to perform a step of, when an error has occurred in execution of the job pertaining to the authenticated user of the mobile terminal, transmitting information regarding the error to the mobile terminal, the reception step may receive the operation content regarding the operation for handling the error, and the execution step may execute the job in which the error has occurred, in accordance with the operation content received in the reception step.

Another aspect of the above embodiments is a recording medium having recorded thereon a program for causing a mobile terminal, which is capable of communication with an image processing apparatus for executing an image processing-related job, to perform processing including: a first transmission step of transmitting, to the image processing apparatus, authentication information necessary for authentication of a user of the mobile terminal in the image processing apparatus; a reception step of, when the user has been authenticated by the image processing apparatus, receiving therefrom a piece of application software that enables at least one operation equivalent to a user operation performed directly on the image processing apparatus in a case of execution of the job pertaining to the authenticated user; and a second transmission step of transmitting, to the image processing apparatus, operation content of an operation performed on the job by the authenticated user with use of the piece of application software.

Also, the program may cause the mobile terminal to perform an input reception step of receiving, from the authenticated user, input of whether to install the received piece of application software; the program may cause the mobile terminal to perform a step of receiving information regarding execution of the job from the image processing apparatus, and a switch step of, in accordance with the received information, switching between deleting the piece of application software and alerting the user of the mobile terminal; the switch step may switch to deleting the piece of application software when the information indicates completion of execution of the job, and to alerting the user when the information indicates that an error has occurred in execution of the job; and the program may cause the mobile terminal to perform a step of receiving information regarding an error that has occurred in execution of the job pertaining to the authentication performed in the image processing apparatus, and an operation reception step of receiving the at least one operation for handling the error in order to enable execution of the job in which the error has occurred, and the second transmission step may transmit, to the image processing apparatus, operation content of the received operation for handling the error.

9. Lastly

Although relationships between the above embodiments, variations and the like has not been particularly described, the content of the embodiments, variations and the like may be appropriately combined.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing system comprising:
an image processing apparatus that includes
a job executor operable to receive an image processing-related job and execute the received image processing-related job, the job executor being operable to execute a plurality of types of image processing-related jobs that differ in output destination from each other,
an authenticator operable to authenticate that a user of a mobile terminal is registered in the image processing apparatus,
a transmitter operable to transmit, to the mobile terminal of the authenticated user, a piece of application software that enables at least one operation for changing processing content of the received image processing-related job, equivalent to a user operation performed directly on the image processing apparatus in a case of execution of the received image processing-related job,
a part operable to transmit, to the mobile terminal of the authenticated user, information indicating that an error has occurred during the execution of the received image processing-related job, and
a receiver operable to receive, from the mobile terminal of the authenticated user, a change in the processing content of the received image processing-related job, indicated by the authenticated user with use of the piece of application software transmitted to the mobile terminal; and
the mobile terminal that includes
a receiver operable to receive the piece of application software,
an application software executor operable to execute the received piece of application software and to receive an operation from the authenticated user for handling the error, and
a transmitter operable to transmit, to the image processing apparatus, the change in the processing content in a case of the authenticated user changing the received image processing-related job with use of the piece of application software, wherein
the change in the processing content of the received image processing-related job corresponds to the operation received from the authenticated user for handling the error, and changes an output destination of the received image processing-related job to a different output destination, and
if the receiver of the image processing apparatus receives the change in the processing content of the received image processing-related job from the mobile terminal before the received image processing-related job is completed, the job executor of the image processing apparatus executes a change in the output destination of the received image processing-related job.

2. An image processing apparatus capable of communication with a mobile terminal, the image processing apparatus comprising:
a job executor operable to receive an image processing-related job and execute the received image processing-related job, the job executor being operable to execute image a plurality of types of processing-related jobs that differ in output destination from each other;
an authenticator operable to authenticate that a user of a mobile terminal is registered in the image processing apparatus;
a transmitter operable to transmit, to the mobile terminal of the authenticated user, a piece of application software that enables at least one operation for changing processing content of the received image processing-related job, equivalent to a user operation performed directly on the image processing apparatus in a case of execution of the received image processing-related job;
a part operable to transmit, to the mobile terminal of the authenticated user, information indicating that an error has occurred during the execution of the received image processing-related job;
a receiver operable to receive, from the mobile terminal of the authenticated user, a change in the processing content of the received image processing-related job, indicated by the authenticated user with use of the piece of application software transmitted to the mobile terminal, wherein
the change in the processing content of the received image processing-related job corresponds to an operation received from the authenticated user of the mobile terminal for handling the error, and changes an output destination of the received image processing-related job to a different output destination, and
if the receiver receives the change in the processing content of the received image processing-related job from the mobile terminal before the received image processing-related job is completed, the job executor executes a change in the output destination of the received image processing-related job.

3. The image processing apparatus of claim 2, wherein the authenticator acquires authentication information of the user of the mobile terminal directly from the mobile terminal with use of wireless communication.

4. The image processing apparatus of claim 2, wherein the piece of application software is transmitted to the mobile terminal of the authenticated user, for execution of only the job received from the authenticated user.

5. A mobile terminal capable of communication with an image processing apparatus for executing a plurality of types of image processing-related jobs that differ in output destination from each other, the mobile terminal comprising:
a transmitter operable to transmit, to the image processing apparatus, authentication information necessary for authentication of a user of the mobile terminal in the image processing apparatus;
a receiver operable to, when the user has been authenticated by the image processing apparatus, receive therefrom a piece of application software that enables at least one operation for changing processing content of an image processing-related job of the image processing-related apparatus, equivalent to a user operation performed directly on the image processing apparatus in a case of execution of the image processing-related job; and
an application software executor operable to execute the received piece of application software and receive an operation from the authenticated user for handling an error identified by the image processing apparatus during execution of the image processing-related job, wherein
the transmitter further transmits, to the image processing apparatus, a change in the processing content of the image processing-related job by the authenticated user with use of the piece of application software, the change in the processing content of the image processing-related job corresponds to the operation received from the authenticated user for handling the error, and changes an output destination of the image processing-related job to a different output destination, and if the image processing apparatus receives the change in the processing content of the image processing-related job from the transmitter of the mobile terminal before the image processing-related job is completed, the image processing apparatus executes a change in the output destination of the image processing-related job.

6. A non-transitory recording medium having recorded thereon a program for causing an image processing apparatus, which is for executing a plurality of types of image processing-related jobs that differ in output destination from each other and capable of communication with a mobile terminal, to perform processing including:

an authentication step of authenticating that a user of the mobile terminal is registered in the image processing apparatus;

a transmission step of transmitting, to the mobile terminal of the authenticated user, a piece of application software that enables at least one operation for changing processing content of the image processing-related job, equivalent to a user operation performed directly on the image processing apparatus in a case of execution of the image processing-related job;

a transmission step of transmitting, to the mobile terminal of the authenticated user, information indicating that an error has occurred during the execution of the image processing-related job;

a reception step of receiving, from the mobile terminal of the authenticated user, a change in the processing content of the image processing-related job, indicated by the authenticated user with use of the piece of application software transmitted to the mobile terminal;

wherein the change in the processing content of the image processing-related job corresponds to an operation received from the authenticated user of the mobile terminal for handling the error, and changes an output destination of the received image processing-related job to a different output destination; and an execution step of executing a change in the output destination of the image processing-related job if the change in the processing content of the image processing-related job is received from the mobile terminal before execution of the image processing-related job is completed.

7. A non-transitory recording medium having recorded thereon a program for causing a mobile terminal, which is capable of communication with an image processing apparatus for executing a plurality of types of image processing-related jobs that differ in output destination from each other, to perform processing comprising:

a first transmission step of transmitting, to the image processing apparatus, authentication information necessary for authentication of a user of the mobile terminal in the image processing apparatus;

a reception step of, when the user has been authenticated by the image processing apparatus, receiving therefrom a piece of application software that enables at least one operation for changing processing content of an image processing-related job of the image processing-related apparatus, equivalent to a user operation performed directly on the image processing apparatus in a case of execution of the image processing-related job;

a reception step of receiving an operation from the authenticated user for handling an error identified by the image processing apparatus during execution of the image processing-related job;

a second transmission step of transmitting, to the image processing apparatus, the changed processing content of the image processing-related job by the authenticated user with use of the piece of application software, wherein the change in the processing content of the image processing-related job corresponds to the operation received from the authenticated user for handling the error, and changes an output destination of the image processing-related job to a different output destination, and if the image processing apparatus receives the change in the processing content of the image processing-related job transmitted in the second transmission step before the image processing-related job is completed, the image processing apparatus executes a change in the output destination of the image processing-related job.

8. The non-transitory recording medium of claim 7, wherein the program causes the mobile terminal to perform an input reception step of receiving, from the authenticated user, input of whether to install the received piece of application software.

9. The non-transitory recording medium of claim 7, wherein the program causes the mobile terminal to perform a step of receiving information regarding execution of the job from the image processing apparatus, and a switch step of, in accordance with the received information, switching between deleting the piece of application software and alerting the user of the mobile terminal.

10. The non-transitory recording medium of claim 9, wherein the switch step switches to deleting the piece of application software when the information indicates completion of execution of the job, and to alerting the user when the information indicates that an error has occurred in execution of the job.

* * * * *